United States Patent
Horlacher

(10) Patent No.: US 11,420,171 B1
(45) Date of Patent: Aug. 23, 2022

(54) FLOW BYPASS DEVICE FOR A VESSEL CONTAINING SOLID PARTICLES

(71) Applicant: Chevron Phillips Chemical Company LP, The Woodlands, TX (US)

(72) Inventor: Steven R. Horlacher, League City, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 17/188,163

(22) Filed: Mar. 1, 2021

(51) Int. Cl.
*B01J 8/00* (2006.01)
*B01J 8/02* (2006.01)
*B01J 19/00* (2006.01)
*B01J 19/24* (2006.01)

(52) U.S. Cl.
CPC ............. *B01J 8/025* (2013.01); *B01J 8/0278* (2013.01); *B01J 2208/00548* (2013.01); *B01J 2208/00938* (2013.01)

(58) Field of Classification Search
CPC ..... B01J 8/00; B01J 8/02; B01J 8/0242; B01J 8/025; B01J 8/0278; B01J 19/00; B01J 19/24; B01J 2208/00; B01J 2208/00008; B01J 2208/00548; B01J 2208/00796; B01J 2208/00938; B01J 2219/00; B01J 2219/24
See application file for complete search history.

(56) References Cited

U.S. PATENT DOCUMENTS

| | | | |
|---|---|---|---|
| 3,509,043 A | 4/1970 | McMaster et al. | |
| 3,598,539 A | 8/1971 | Pizzato | |
| 3,607,000 A | 9/1971 | Beal et al. | |
| 3,702,238 A | 11/1972 | Armistead et al. | |
| 4,380,529 A | 4/1983 | Ramesh et al. | |
| 6,692,705 B2 * | 2/2004 | Gupta | B01J 8/008 422/211 |
| 2002/0068027 A1 | 6/2002 | Ramesh et al. | |
| 2021/0115341 A1 | 4/2021 | Sampath | |

FOREIGN PATENT DOCUMENTS

| | | |
|---|---|---|
| CN | 102441348 A | 5/2012 |
| CN | 103100354 A | 5/2013 |

* cited by examiner

*Primary Examiner* — Natasha E Young
(74) *Attorney, Agent, or Firm* — Conley Rose, P.C.

(57) ABSTRACT

Disclosed is a flow bypass device, a reactor system containing the flow bypass device; a method for operating a fixed bed of solid particles in which gas is re-routed to an interior of the fixed bed, for example, the flow bypass device is used to bypass a portion of the solid particles; and a method for loading solid particles and a flow bypass device into a vessel. The methods and systems can use a single flow bypass device or multiple flow bypass devices that are stacked on top of one another.

23 Claims, 10 Drawing Sheets

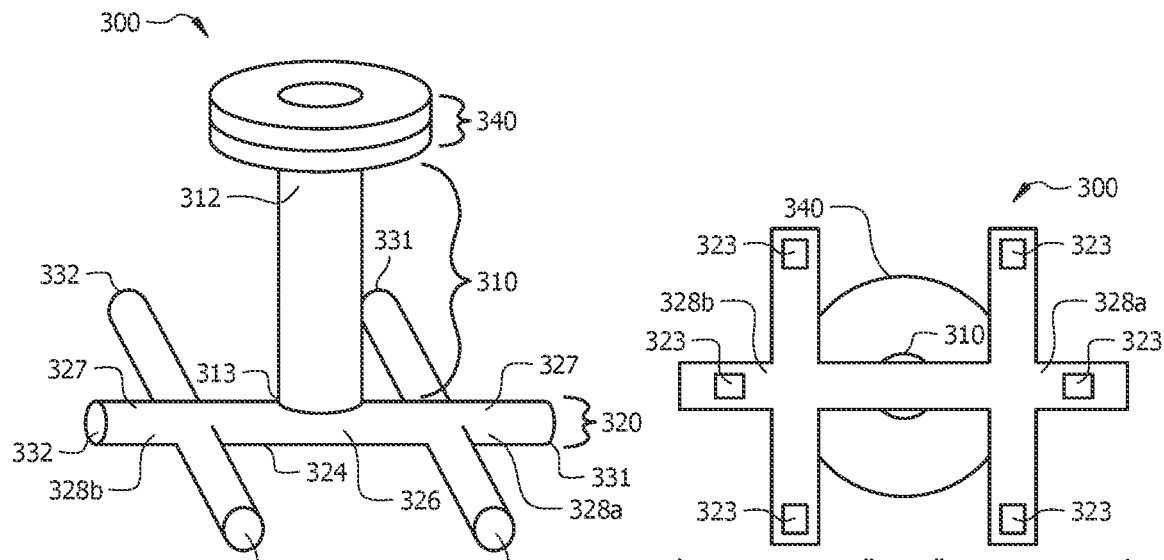
FIG. 3A
FIG. 3B
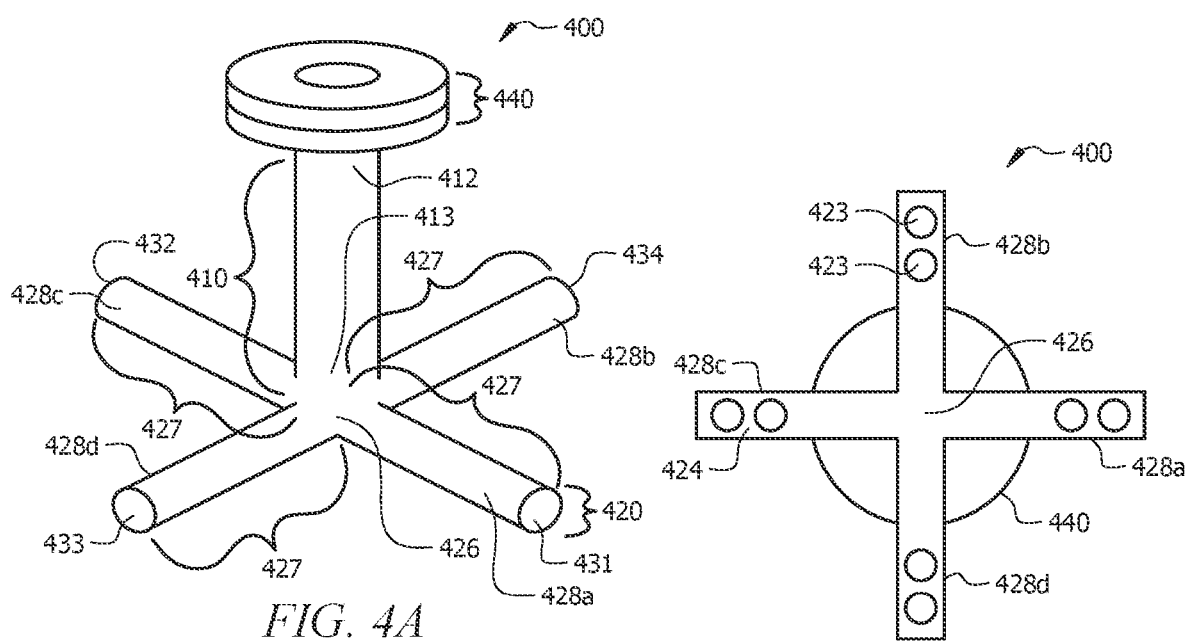
FIG. 4A
FIG. 4B

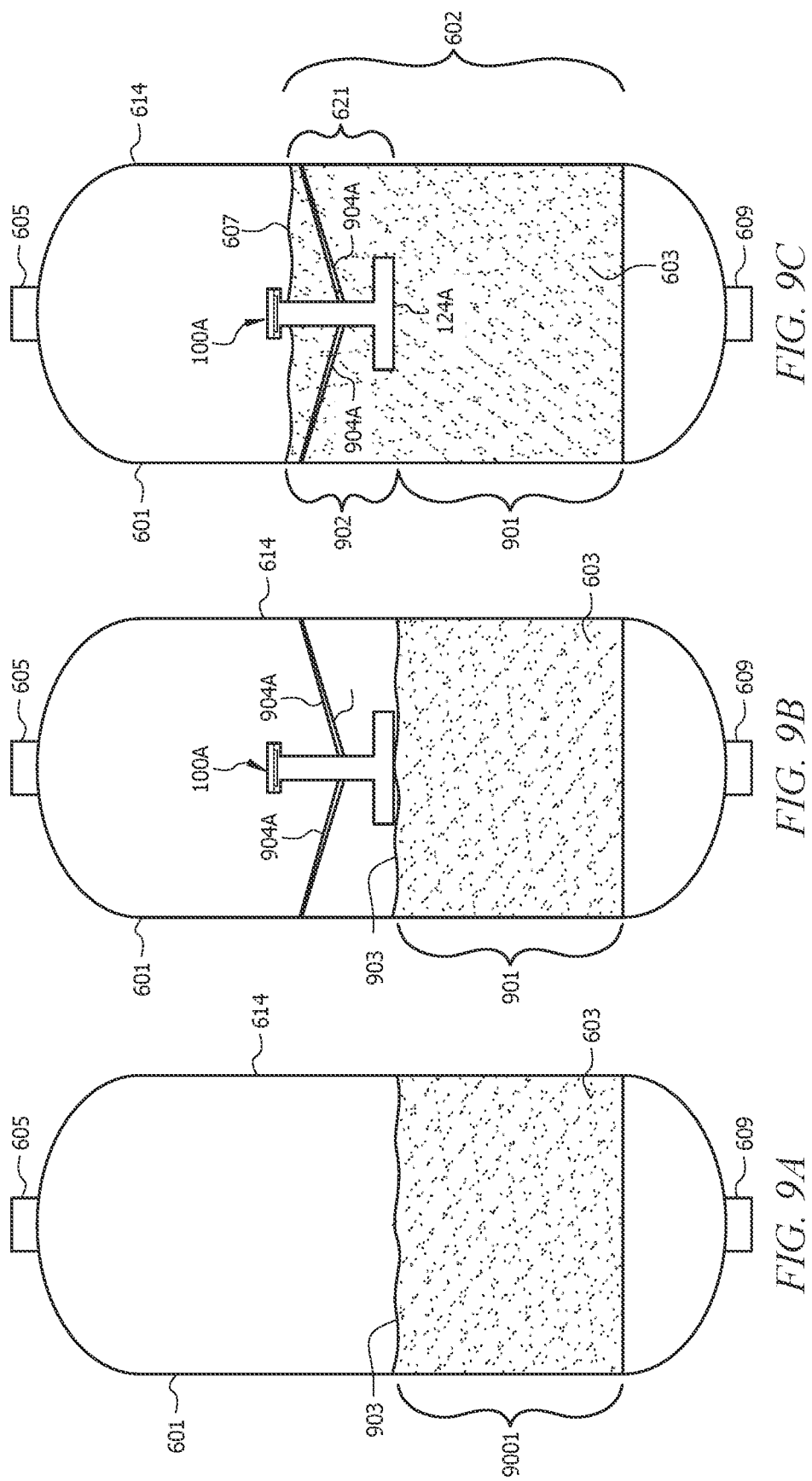

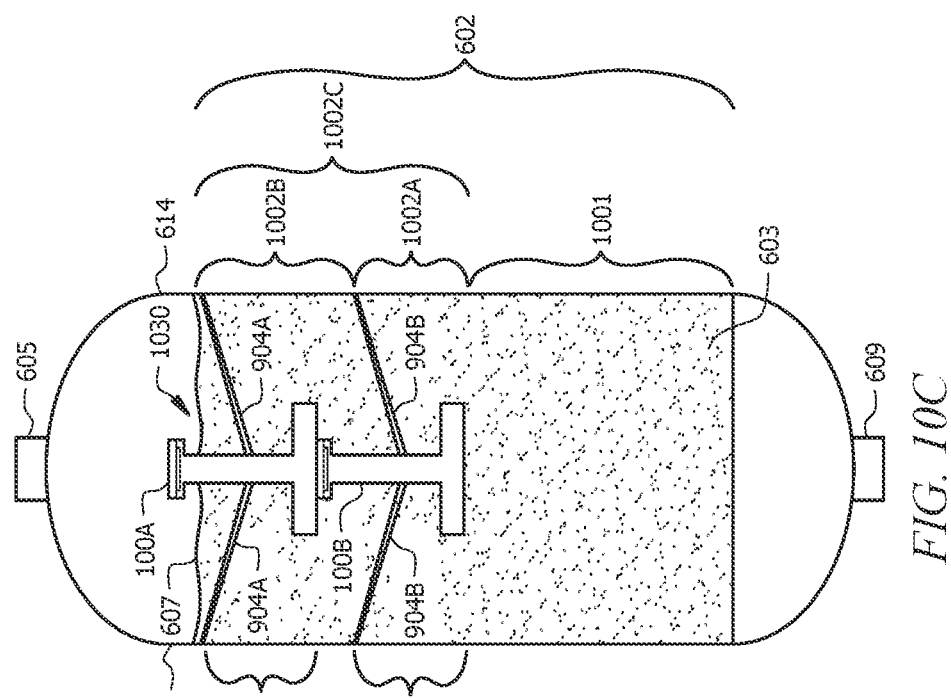
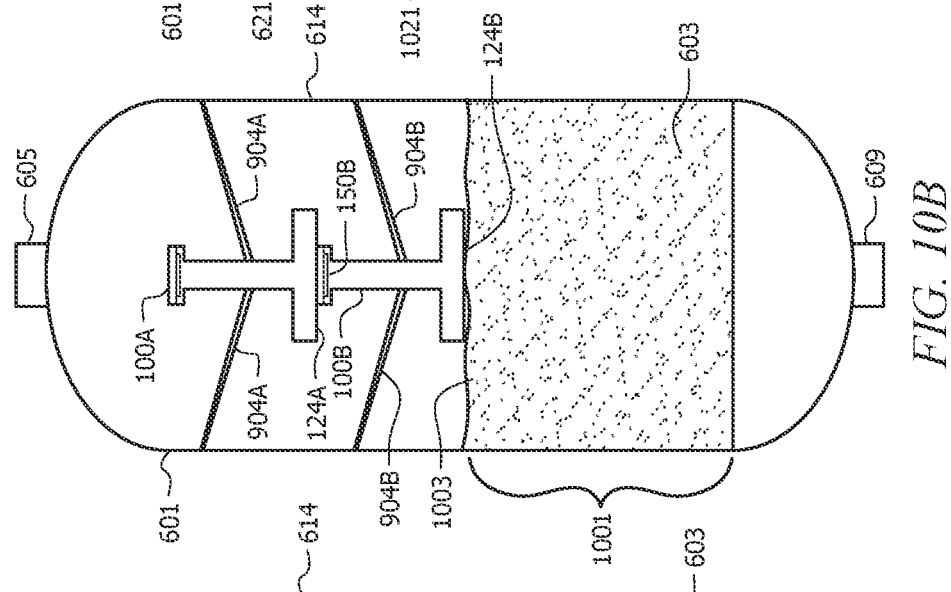
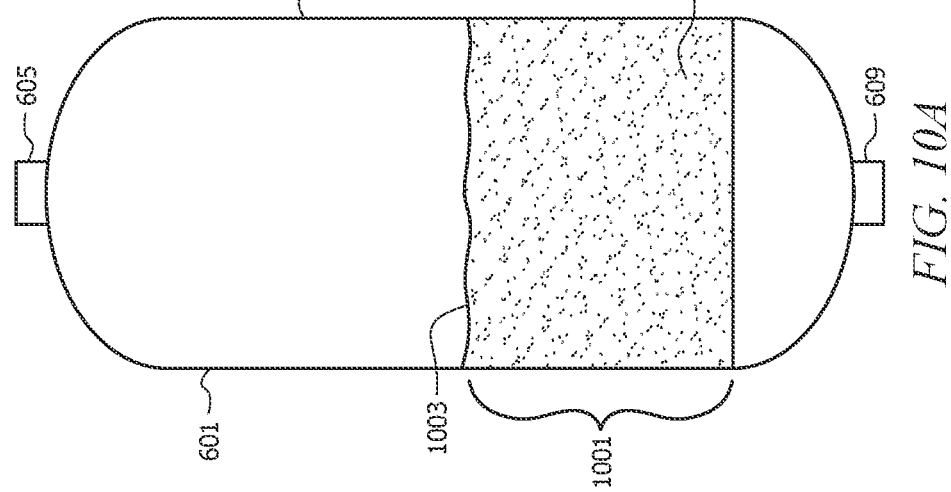
FIG. 10C
FIG. 10B
FIG. 10A

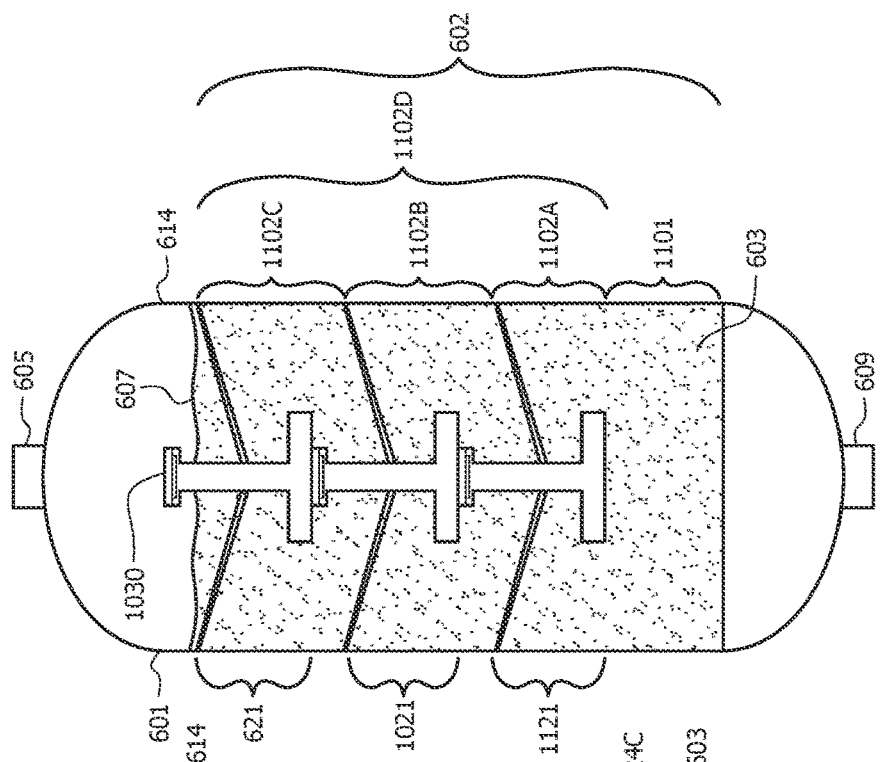
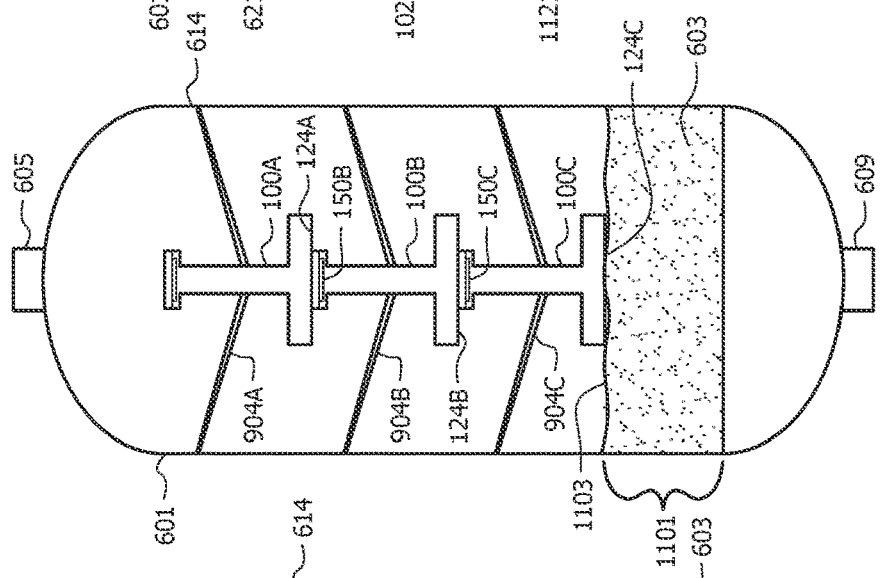
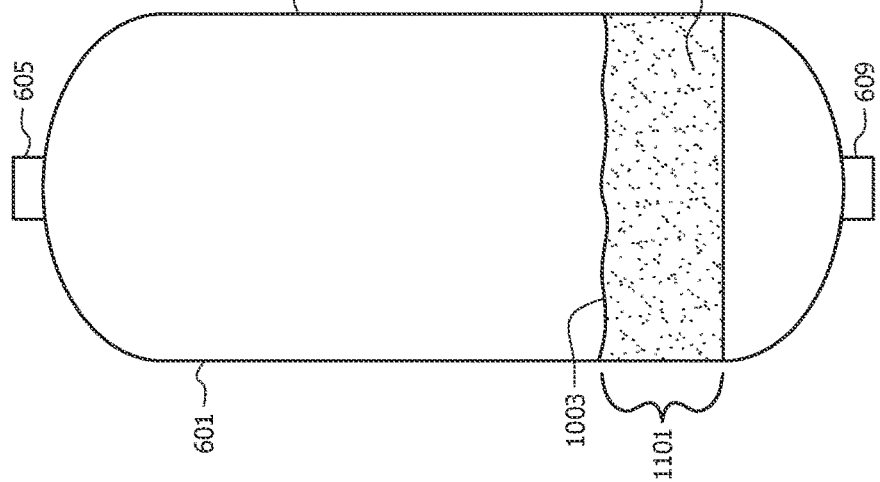
FIG. 11A
FIG. 11B
FIG. 11C

FLOW BYPASS DEVICE FOR A VESSEL CONTAINING SOLID PARTICLES

TECHNICAL FIELD

The present disclosure relates to the fouling of fixed beds of solid particles contained within a down-flow oriented vessel in a gas, vapor, or liquid service.

BACKGROUND

Various reactions and separations in the hydrocarbon processing and petrochemical industry involve passing a gas or vapor through a fixed bed of solid inert and catalyst particles, in order to react one or more components in the gas within the vessel, or to remove one or more components in the gas within the vessel. Over time, the solid particles, particularly at the top of the fixed bed in a down-flow oriented vessel, can become fouled with contaminants such as coke, undesired polymer from reactions, scale, rust, debris from upstream equipment, or a combination thereof. The fouling of the particles can cause the pressure of the gas in the vessel above the top of the bed to increase as the flow of the gas is restricted through the fouled portion of the fixed bed due to a decrease in void volume. This increased pressure can be referred to as a differential pressure, or pressure drop (also referred to as $\Delta P$, deltaP, or dP). The increased differential pressure places strain on the vessel and upstream or downstream equipment and is limited by the design pressure of the vessel and internals and upstream or downstream equipment. Once the differential pressure is outside or exceeds the design range, a significant reduction in gas rate to the fixed bed or a shut-down and maintenance of the fixed bed to remove the source of the differential pressure is required.

To address these issues, flow bypass devices do exist in the art; however, there is a need to improve flow bypass devices for use in the applications described herein.

SUMMARY

A method for operating a vessel containing a fixed bed of solid particles, comprising: flowing a gas through a first flow bypass device and into an interior of the fixed bed of the solid particles that is below a top of the fixed bed; wherein the gas exits a distributor portion of the first flow bypass device in a down-flow direction.

A method for loading solid particles and a flow bypass device in a vessel, comprising: placing a first portion of the solid particles into the vessel; assembling a first flow bypass device on a top of the first portion of the solid particles; and filling the vessel with a second portion of the solid particles such that a bottom of the first flow bypass device is surrounded by the solid particles, wherein the first flow bypass device has a pipe portion and a distributor portion, wherein the distributor portion is connected to a bottom of the pipe portion, and a flow channel is formed within the pipe portion and the distributor portion, wherein openings formed in a bottom of the distributor portion face a bottom of the vessel, and wherein a first rupture disk is located proximate the top of the pipe portion.

A flow bypass device comprising: a pipe portion having a first flow channel formed therein and extending from a first end of the pipe portion to a second end of the pipe portion; a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion; and a rupture disk coupled to the first end of the pipe portion.

A reactor system comprising: a reactor vessel; a catalyst bed contained within the vessel; and a flow bypass device having a lower portion contained within the catalyst bed, wherein the flow bypass device is configured to direct gas to an interior of the catalyst bed only in a down-flow direction.

A method for operating a vessel containing a fixed bed of solid particles, comprising: flowing a gas in a down-flow direction in the vessel; and upon experiencing a fouling of a top of the fixed bed of solid particles, re-routing the gas to an interior of the fixed bed only in the down-flow direction.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 3A illustrates a perspective view of a flow bypass device, and FIG. 3B illustrates a bottom view of the flow bypass device in FIG. 3A.

FIG. 4A illustrates a perspective view of a flow bypass device, and FIG. 4B illustrates a bottom view of the flow bypass device in FIG. 4A.

FIGS. 9A-9C illustrate side views of a vessel containing solid particles and a flow bypass device, for purposes of describing a method according to the disclosure.

FIGS. 10A-10C illustrate side views of a vessel containing solid particles and two stacked flow bypass devices, for purposes of describing another method according to the disclosure.

FIGS. 11A-11C illustrate side views of a vessel containing solid particles and three stacked flow bypass devices, for purposes of describing another method according to the disclosure.

Figure 1:
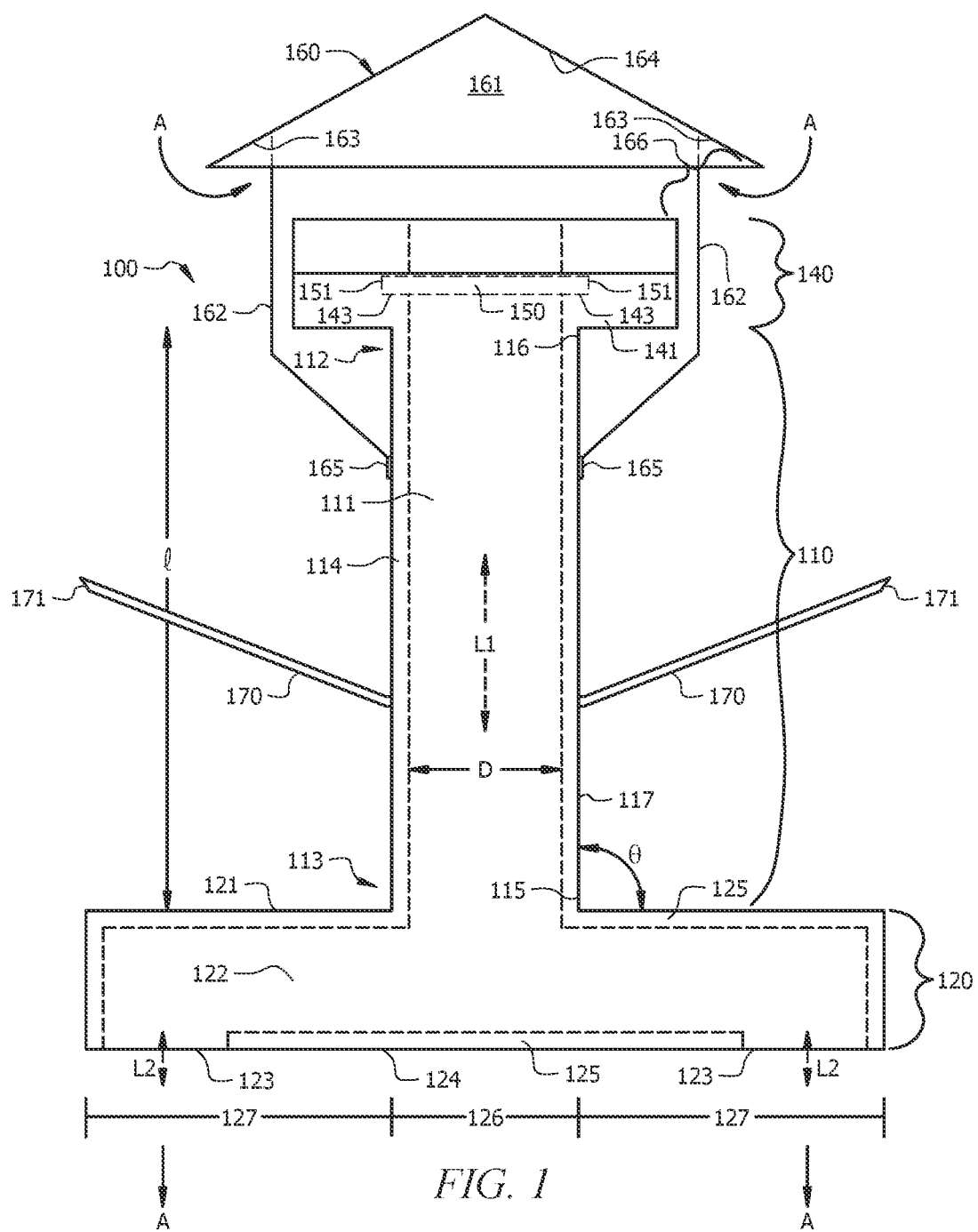
FIG. 1 illustrates a side view of a flow bypass device according to the disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The figures described above and the written description of specific structures and functions below are not presented to limit the scope of what Applicant has invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

The terms "configured to", "configured for use", "adapted for use", and similar language is used herein to reflect that the particular recited structure or procedure is used in the disclosed methods or systems.

The term "stream" as used herein refers to a physical composition of materials that flow through a conduit or line.

Disclosed herein is a flow bypass device, systems having the flow bypass device, and methods for operating a vessel that utilizes the flow bypass device for bypassing, directing, re-directing, or re-routing gases into an interior of a fixed bed of solid particles contained within the vessel.

Use of the disclosed flow bypass device in the disclosed systems and methods can extend the run length of the catalyst or dessicants within a vessel containing the flow bypass device because, by reducing the differential pressure by bursting a rupture disk and re-directing, or re-routing gases into an interior of a fixed bed. The rupture disk is chosen to have a burst pressure (at the vessel operating temperature) that is below a maximum desired differential pressure for which the vessel and internals and upstream or downstream equipment was designed, the differential pressure in the vessel can be maintained within the range designed for vessel operation for longer periods of time. The extended operation time is time spent online that would otherwise be spent offline replacement of the fouled solid particles in the vessel. Moreover, embodiments and aspects which utilize stacked flow bypass devices further extend operation time and provide safety mechanisms for the further extended time of operation.

Moreover, the design of the flow bypass device re-routes gas past the fouled catalyst particles and into the interior of the fixed bed of catalyst particles in a down-flow direction. Releasing gas only in the down-flow direction (as opposed to an upward direction or a radial direction) increases the likelihood that the gas contacts solid particles in the interior of the fixed bed that are not fouled or otherwise contaminated. Moreover, release of gas only in the down-flow direction (as opposed to an upward direction or a radial direction) encourages flow within the bed in a down-flow direction and helps avoid disturbing the fixed bed with an upward flow of gas in the fixed bed. Disturbing a fixed bed can cause channeling or gas pockets in the fixed bed and produce undesirable products.

It should be understood that the figures described herein illustrate inventive aspects and embodiments of flow bypass devices and the use thereof; however, for clarity, not all details (such as seams or flanges that one skilled in the art might add so that assembly of components of the flow bypass device can occur either inside or outside of a vessel) are shown in the figures.

Turning now to the figures, FIG. 1 illustrates a side view of a flow bypass device 100 according to the disclosure. The flow bypass device 100 can include a pipe portion 110, a distributor portion 120, and a top assembly 140. The flow bypass device 100 in FIG. 1 is configured to be used alone or in a stacked configuration with another flow bypass device having the same or different configuration.

The pipe portion 110 is generally a tubular structure such that a first flow channel 111 formed therein extends from a first end 112 to a second end 113 of the pipe portion 110. The pipe portion 110 can have any tubular shape such as circular shape, oval shape, triangular shape, quadrilateral shape, polygonal shape, cross shape, star shape, or irregular shape. The wall 114 of the pipe portion 110 defines the contour of first flow channel 111 (e.g., cylindrical flow channel). In vertical orientation, the first end 112 of the pipe portion 110 is above the second end 113, and the first end 112 can include the top 116 of the pipe portion 110 and the second end 113 can include the bottom 115 of the pipe portion 110.

The length l of the pipe portion 110 can be in a range of from about 1 ft to about 50 ft (0.3048 m to 15.24 m). In aspects, the length l of the pipe portion 110 can be in a range of 1% to 50% of the height of a vessel in which the flow bypass device 100 is placed. A diameter D of the pipe portion 110 can be in the range of from about 1 in to about 24 inches Nominal Pipe Size (NPS) (25 mm to 600 mm Diametre Nominal (DN)).

In aspects, the pipe portion 110 has no perforations. For example, no perforations are formed in the wall 114 of the pipe portion 110 such that no gas exits laterally (or radially outwardly with respect to a vessel) from the pipe portion 110 into a bed of solid particles in which the flow bypass device 100 is placed.

The distributor portion 120 can be connected to the second end 113 of the pipe portion 110. More particularly, the top 121 of the distributor portion 120 can be connected to the bottom 115 of the pipe portion 110. A second flow channel 122 can be formed in the distributor portion 120 that is fluidly connected to the first flow channel 111 of the pipe portion 110 and to one or more openings 123 formed in a bottom 124 of the distributor portion 120. Each of the openings 123 can be covered with a mesh screen having a mesh size suitable for preventing catalyst particles from entering the second flow channel 122 in the distributor portion 120. The wall(s) 125 of the distributor portion 120 define(s) the shape of the second flow channel 122. The first flow channel 111 in the pipe portion 110 and the second flow channel 122 in the distributor portion 120 together form the flow channel or flow path through which gas can flow within the flow bypass device 100.

In aspects, the first flow channel 111 and the second flow channel 122 are sized such that the flow rate of gas through the first flow channel 111 is the same as the flow rate of the gas through the second flow channel 122. For example, the cross-sectional area of the first flow channel 111 can be greater than or equal to the total cross-sectional area (e.g., the sum of cross-sectional areas of all flow pathways) of the second flow channel 122. While this relationship is discussed for the flow bypass device 100 in FIG. 1, this relationship can be applicable to any flow bypass device disclosed herein.

In additional aspects, the first flow channel 111 and the openings 123 are sized such that the flow rate of gas through the first flow channel 111 is the same as the flow rate of the gas through the openings 123. For example, the cross-section area of the first flow channel 111 can be greater than or equal to the total cross-sectional area of all the openings 123, where the total cross-sectional area of all the openings 123 is the sum of the cross-sectional areas of the openings 123. While this relationship is discussed for the flow bypass device 100 in FIG. 1, this relationship can be applicable to any flow bypass device disclosed herein.

It is contemplated that the distributor portion 120 can have any geometrical shape. In aspects, the distributor portion 120, regardless of the shape, can have a center section 126 and a periphery section 127 connected to the center section 126. In aspects, the center section 126 of the top 121 of the distributor portion 120 can be connected to the bottom 115 of the pipe portion 110. In aspects, the one or more openings 123 can be formed in the bottom 124 of the distributor portion 120 only in the periphery section 127 and not in the center section 126. Generally, dimensions of the center section 126 can correspond with the diameter D of the pipe portion 110, and the periphery section 127 can extend radially outwardly from the center section 126 such that the longitudinal axis L2 of each of the openings 123 does not extend within the first flow channel 111.

It is contemplated that the one or more openings 123 can have any shape or combination of shapes. In aspects, the one or more openings 123 can each have any shape when viewed from the bottom 124 of the distributor portion 120, for example, each opening 123 can have a circular shape, oval shape, triangular shape, quadrilateral shape, polygonal shape (e.g., five or more sides), cross shape, star shape, or irregular shape.

The shape of each of the openings 123 can be configured to facilitate flow of gas out of the distributor portion 120 only in a down-flow direction (as indicated by arrows A in FIG. 1).

In aspects, a wire mesh can be placed over each of the one or more multiple openings 123 on the bottom 124 of the distributor portion 120 of the flow bypass device 100 in order to prevent solid particles from entering the distributor portion 120 of the flow bypass device 100 through the openings 123.

In aspects, an angle θ between the outer surface 117 of the pipe portion 110 and the top 121 of the distributor portion 120 can be any angle in the range of 45°-135°. In FIG. 1, the angle θ is about 90°.

In aspects, a longitudinal axis L2 of each of the one or more openings 123 is parallel to a longitudinal axis L1 of the pipe portion 110 to facilitate flow of gas out of the openings 123 in the down-flow direction. In further aspects, the longitudinal axis L2 of each of the one or more openings 123 is parallel to a longitudinal axis L1 of the pipe portion 110 in combination with the angle θ between the outer surface 117 of the pipe portion 110 and the top 121 of the distributor portion 120 being in the range of 45°-135°, so as to facilitate the down-flow direction of gas out of the openings 123. In some further aspects, the longitudinal axis L2 of each of the one or more openings 123 is parallel to a longitudinal axis L1 of the pipe portion 110 in combination with the angle θ between the outer surface 117 of the pipe portion 110 and the top 121 of the distributor portion 120 being in the range of 45°-135° but not 90°, so as to facilitate the down-flow direction of gas out of the openings 123.

The top assembly 140 is coupled to the first end 112 of the pipe portion 110 and is configured to hold a rupture disk or rupture disk assembly 150. The configuration of the top assembly 140 in FIG. 1 includes flanges 141 and 142 sized to match the size of the pipe portion 110. Flange 141 is a bottom flange and flange 142 is a top flange, secured together by any technique known in the art with the aid of this disclosure, such as by nuts and bolts. The flanges 141 and 142 are configured to hold the rupture disk or rupture disk assembly 150. A groove 143 can be formed in the bottom flange 141 to hold a circumferential lip 151 of the rupture disk 150. Flange 141 and flange 142 may be configured from commercially available rupture disk holders or may be flanges that hold a rupture disk holder. An example of a commercially available rupture disk holder is the Bolted Type Rupture Disk Holder, which is available from Fike Corporation.

The rupture disk 150 can be embodied as any commercially available rupture disk having a burst pressure in a range of from about 5 psi to about 75 psi (34.5 kPa to 517.1 kPa) differential pressure at the expected operating temperature of the vessel. An example of a commercially available rupture disk is the P/CPV and HO/HOV Series Rupture Disk, which is available from Fike Corporation. Rupture disks are formed as a non-permeable layer of material (e.g., metal) that bursts, ruptures, tears, or a combination thereof once the tensile load on the disk exceeds the rated burst pressure. The burst pressure of rupture disks is determined by the manufacturer and stamped on the rupture disk tag. The burst pressure represents the difference in pressure, or ΔP, between the two faces of the rupture disk in the direction which the disk is designed to fail. The rupture disks disclosed herein can be forward acting, reverse acting, and may or may not be scored. In aspects, the diameter of the rupture disk 150 is the same as the diameter D of the pipe portion 110 of the flow bypass device 100.

A cap 160 can optionally be coupled to the top assembly 140, the pipe portion 110, or both the top assembly 140 and the pipe portion 110. The cap 160 generally extends over the rupture disk 150 and the top assembly 140 such that the cap 160 is configured to deflect any debris (e.g., solid particles) from falling on top of the rupture disk 150 and from accumulating on top of the rupture disk 150. The cap 160 can have a cover 161 and at least two arms 162 that couple the cover 161 to the top assembly 140, the pipe portion 110, or both the top assembly 140 and the pipe portion 110. Ends 163 of the at least two arms 162 can be connected to the underside 164 of the cover 161 by any technique such as by weld or bolts. Opposite ends 165 of the at least two arms 162 can be connected to the top assembly 140, to the pipe portion 110, or both the top assembly 140 and the pipe portion 110 by any technique such as by weld or bolts. The flow bypass device 100 can be fabricated in pieces that can be fit through a vessel inlet (e.g., inlet 605 in FIG. 6, or a manway, or a vessel flange) and then assembled. In FIG. 1, the opposite ends 165 of the arms 162 are connected to the pipe portion 110 and not to the top assembly 140.

Gas can flow in a gap 166 between the cover 161 of the cap 160 and the top assembly 140, for example, in a manner shown by arrows A in FIG. 1 (arrows A are for illustrative purposed and are not intended to represent the exact flow-path of gas). The gap 166 is a circumferential gap that is interrupted by the at least two arms 162 of the cap 160. An area of the gap 166 can be greater than or equal to a cross-sectional area of the first flow channel 111. Having the area of the gap 166 greater than or equal to the cross-sectional area of the first flow channel 111 ensures that the flow rate of gas through the gap 166 is the same as the flow rate of gas through the gap 166 and also prevents a differential pressure between the cap 160 and the top assembly 140 created by the flow of gas into the flow bypass device 100 after the rupture disk 150 bursts.

Figure 6:
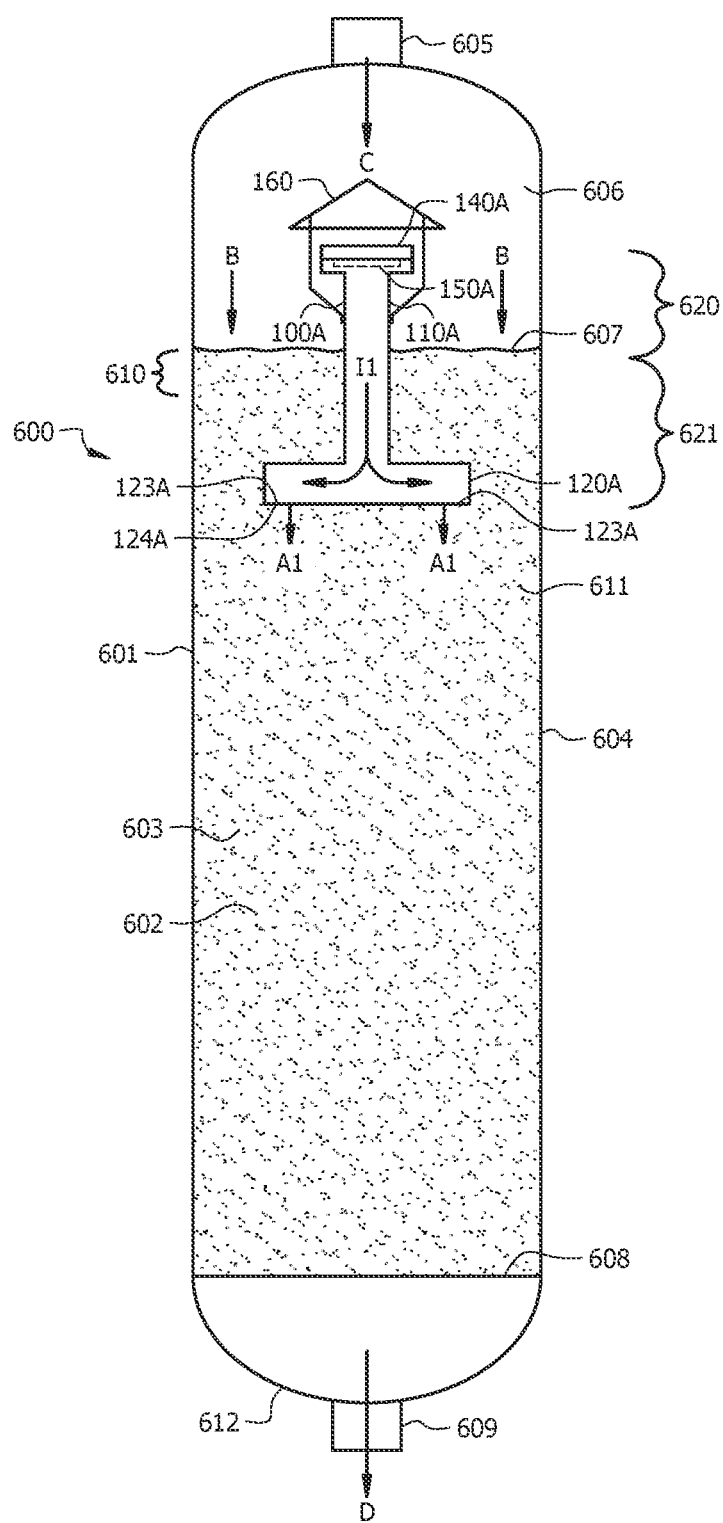
FIG. 6 illustrates a side view of a system according to the disclosure.
Figure 7:
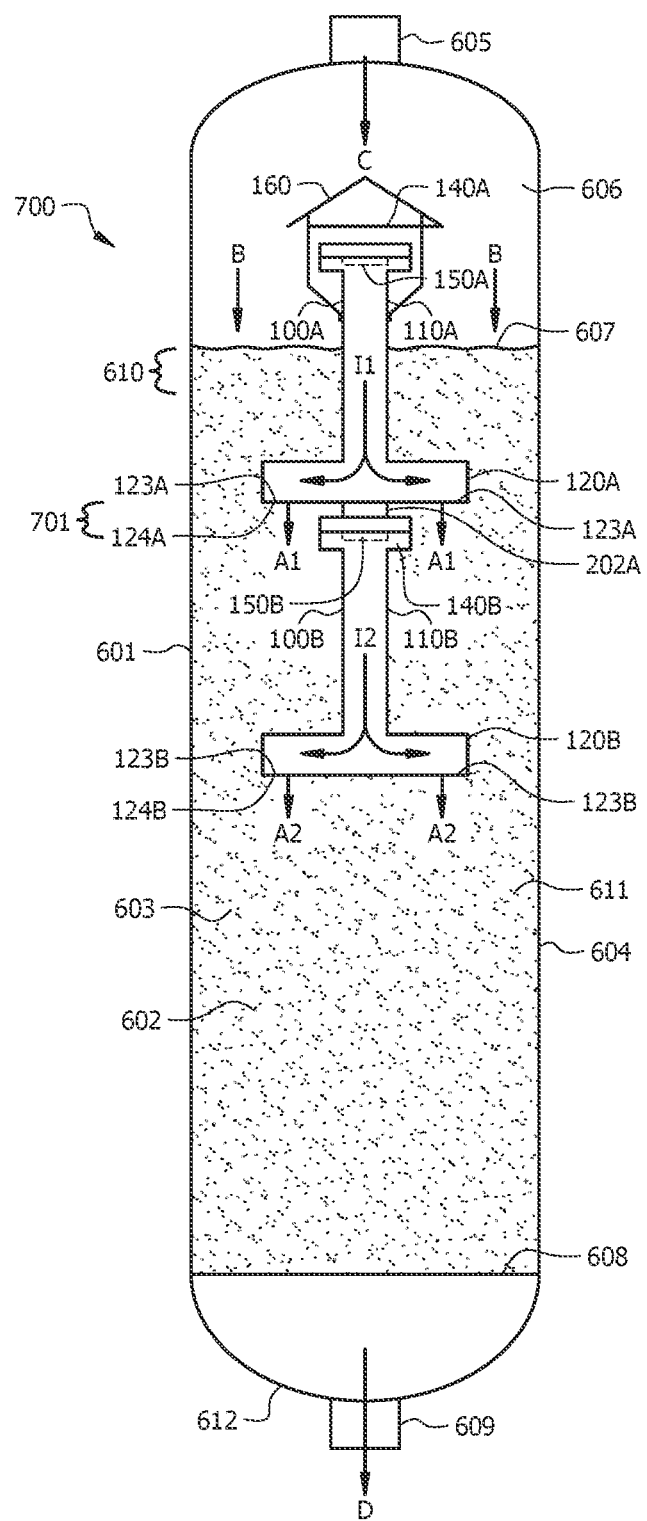
FIG. 7 illustrates a side view of another system according to the disclosure.
Figure 8:
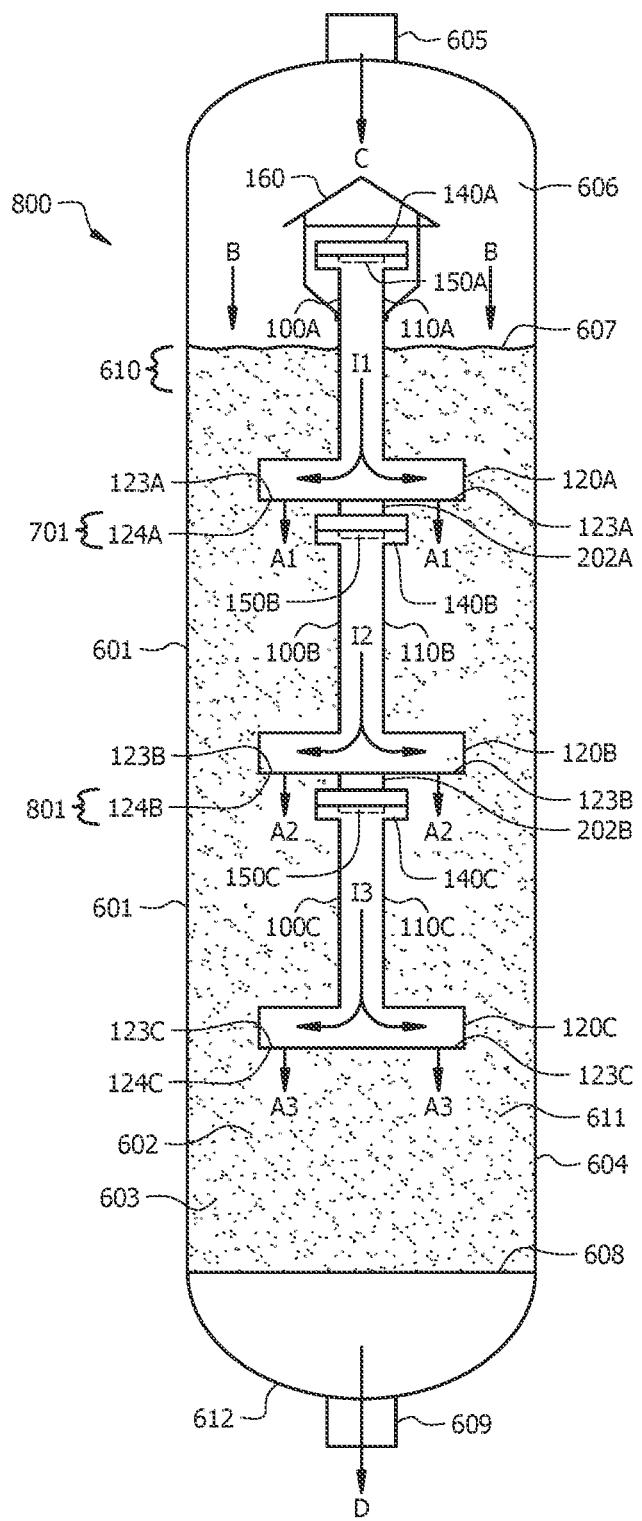
FIG. 8 illustrates a side view of another system according to the disclosure.

The flow bypass device 100 can generally be fabricated of a metal that corresponds to the metal of the vessel in which the flow bypass device 100 is used, so as to be of a material compatible with the chemical species encountered in the vessel. The flow bypass device 100, and all individual components, can be fabricated in pieces that can be fit through a vessel inlet (e.g., inlet 605 in FIG. 6, or a manway, or a vessel flange) and then assembled (e.g., bolting or welding pieces together) within the vessel, or the flow bypass device 100 can be sized such that the device 100 can be preassembled outside the vessel and can fit through the vessel inlet (e.g., inlet 605 in FIG. 6, or a manway, or a vessel flange). For example, the cap 160 and the distributor portions 120A, 120B, and 120C of the respective flow bypass devices 100A, 100B, and 100C in FIGS. 6-8 are shown having a diameter larger than the inlet 605 of the vessel 601 for purposes of illustration; however, it is contemplated that the pieces of the distributor portions 120A, 120B, and 120C prior to assembly are appropriately sized to fit through an entrance to the vessel 601, for example, the inlet 605 or a manway or a vessel flange.

In optional embodiments, the flow bypass device 100 can include a centering device that is coupled to the pipe portion 110 and/or to the distributor portion 120 and configured to center the flow bypass device 100 in a vessel. The centering device can be embodied as any structure than can attach or couple to the pipe portion 110 and/or to the distributor portion 120 and perform the function of centering and holding the flow bypass device 100 in a vessel. In FIG. 1, rods 170 are illustrated as the centering device, and are attached to the pipe portion 110. The rods 170 can be bolted, welded, or coupled (e.g., via a hinge or rod holder) to the pipe portion 110 or distributor portion 120 of the flow bypass device 100. The centering device is configured to have at least a portion that rests again or otherwise contacts an internal wall of a vessel in which the flow bypass device 100 is contained, in order to keep the flow bypass device 100 centered within the vessel. In FIG. 1, the ends 171 of the rods 170 are configured to rest against, contact, or be connected to the wall of the vessel. While shown in FIG. 1 as extending radially outwardly and upward from the pipe portion 110, it is contemplated that the centering device can extend radially outwardly from the pipe portion 110 and/or distributor portion 120, in any upward or downward direction, or horizontally.

Figure 2:
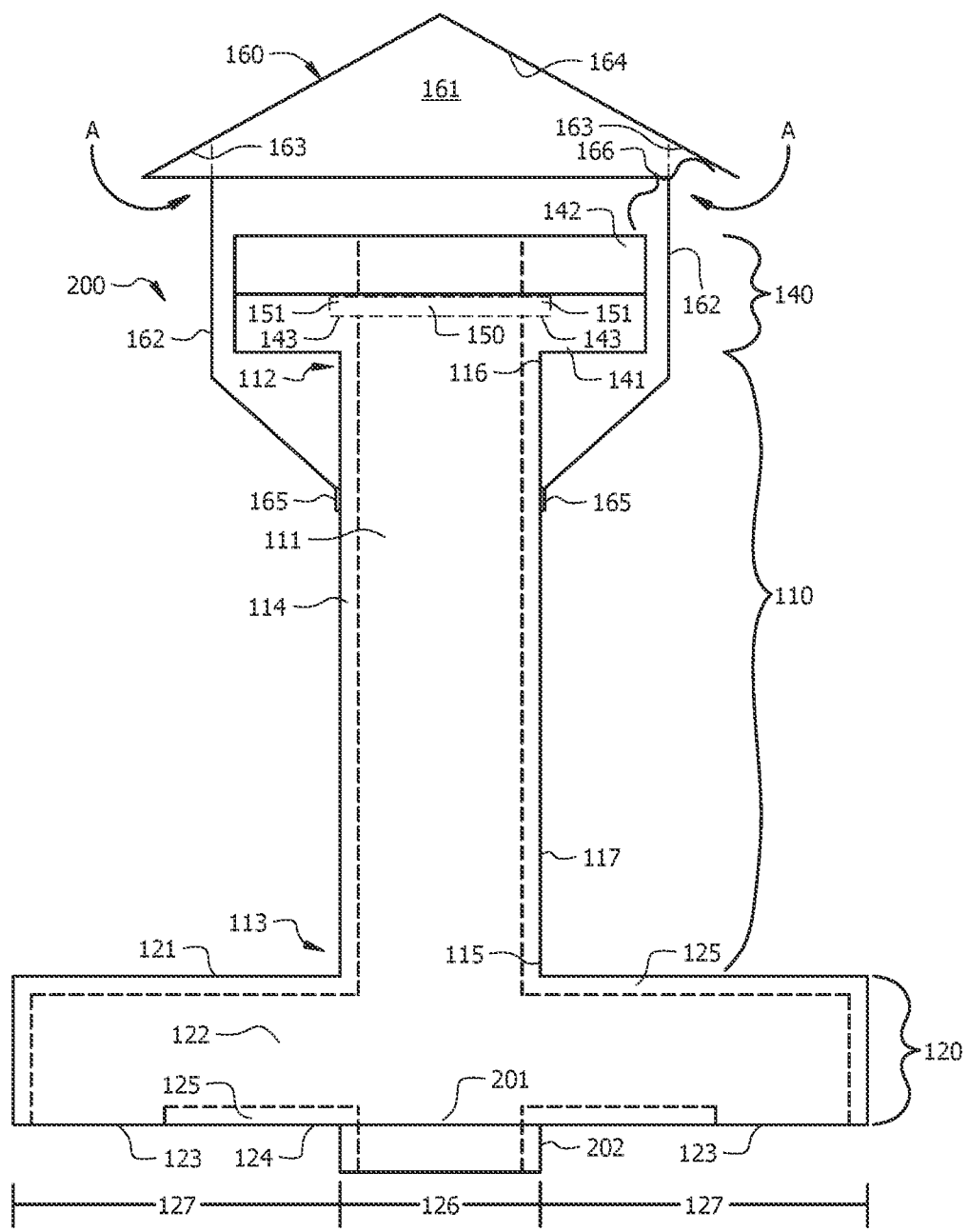
FIG. 2 illustrates a side view of another flow bypass device according to the disclosure.

FIG. 2 illustrates a side view of another flow bypass device 200 according to the disclosure. In FIG. 2, like reference numerals represent like parts as described for FIG. 1, and the parts in FIG. 2 can have any embodiment described for the corresponding part in FIG. 1.

The flow bypass device 200 in FIG. 2 is configured to be stackable with another flow bypass device having a same or different configuration. The flow bypass device 200 has a center opening 201 formed in the center section 126 on the bottom 124 of the distributor portion 120. The center opening 201 is sized to couple with the top assembly of another flow bypass device. Alternatively, the flow bypass device 200 can include an optional spacer 202 that is a hollow tubular structure configured to provide spacing between the bottom 124 of the flow bypass device 200 and the top assembly of the flow bypass device on which the flow bypass device 200 is stacked. For example, space may be needed for bolts of the flanges of another top assembly on which the flow bypass device 200 is stacked. The spacer 202 can have any tubular shape such as circular shape, oval shape, triangular shape, quadrilateral shape, polygonal shape, cross shape, star shape, or irregular shape. The diameter of the spacer 202 is sized to fluidly couple the center opening 201 with the top assembly of another flow bypass device, and it is thus contemplated that the diameter of the spacer 202 can vary (increase or decrease) along a length thereof, or can be of constant diameter.

The center opening 201 in the distributor portion 120 can have any shape, such as a circular shape, oval shape, triangular shape, quadrilateral shape, polygonal shape (e.g., five or more sides), cross shape, star shape, or irregular shape. The shape of the center opening 201 can match the shape of the top assembly of another top assembly on which the flow bypass device 200 is stacked.

For embodiments of flow bypass device 200 that has a center opening 201, the one or more openings 123 in the periphery section 127 can be called periphery openings 123.

The bottom 124 of the distributor portion 120 in the center section 126 can be connected to another flow bypass device by any technique known in the art for connecting metal parts, such as by welding, bolts, or other secure connection technique.

In optional embodiments, the flow bypass device 200 can include a centering device as described for FIG. 1.

FIG. 3A illustrates a perspective view of a flow bypass device 300, and FIG. 3B illustrates a bottom view of the flow bypass device 300 in FIG. 3A. The flow bypass device 300 has a pipe portion 310, distributor portion 320, and a top assembly 340 containing a rupture disk. The pipe portion 310 is embodied as a pipe having the first end 312 connected to the top assembly 340 and the second end 313 connected to the distributor portion 320. The distributor portion 320 is embodied as a pipe having cylindrical center in the center section 326 and pipe branches 328a and 328b in the periphery section 327. Each branch 328a and 328b in FIG. 3A is in the shape of a cross. The ends 331 and 332 of the branches 328a and 328b are sealed so that gas flows out of the flow bypass device 300 only through openings 323 formed in the bottom 324 of the distributor portion 320. The area of the openings 323 can be equal or greater to the flow area of the first flow channel 111 and second flow channel 122. As can be seen, the openings 323 are formed only in the periphery section 327 of the distributor portion 320. The openings 323 in FIGS. 3A and 3B are embodied as having a square shape.

In aspects, the total flow cross-sectional area of the distributor portion 310, which is the sum of cross-sectional areas of all the branches (e.g., branches 328a and 328b) of the distributor portion 310, is equal to a greater than the cross-sectional area of the pipe portion 310. This relationship can apply to any of the flow bypass devices described herein.

FIG. 4A illustrates a perspective view of a flow bypass device 400, and FIG. 4B illustrates a bottom view of the flow bypass device 400 in FIG. 4A. The flow bypass device 400 has a pipe portion 410, distributor portion 420, and a top assembly 440 containing a rupture disk. The pipe portion 410 is embodied as a pipe having the first end 412 connected to the top assembly 440 and the second end 413 connected to the distributor portion 420. The distributor portion 420 is embodied as a pipe cross having a cross-shaped center in the center section 426 and pipe branches 428a, 428b, 428c, and 428d in the periphery section 427. The ends 431, 432, 433, and 444 of each of the branches 428a, 428b, 428c, and 428d are sealed so that gas flows out of the flow bypass device 400 only through openings 423 formed in the bottom 424 of the distributor portion 420. As can be seen, the openings 423 in FIGS. 4A and 4B are embodied to have a circular shape.

Figure 5A:
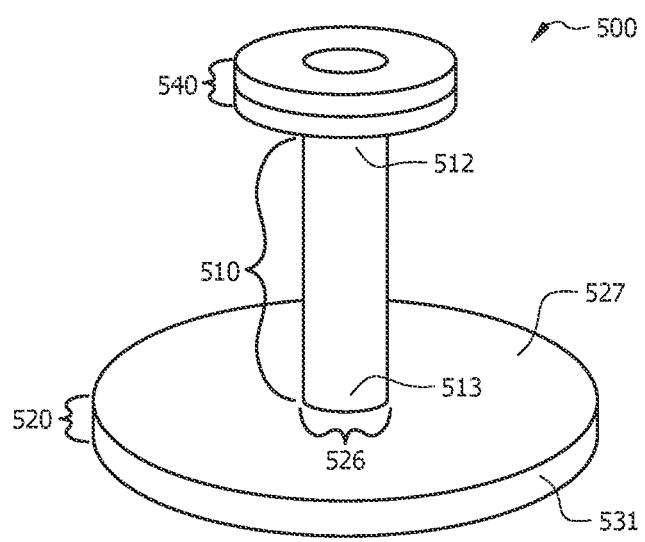
FIG. 5A illustrates a perspective view of a flow bypass device.
Figure 5B:
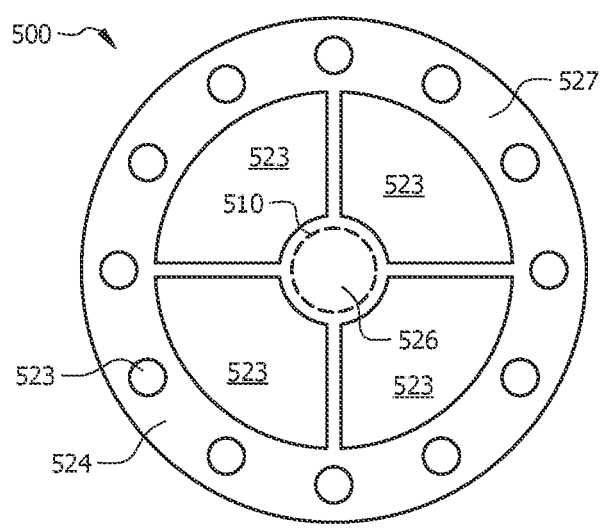
FIG. 5B illustrates a bottom view of the flow bypass device in FIG. 5A.

FIG. 5A illustrates a perspective view of a flow bypass device 500, and FIG. 5B illustrates a bottom view of the flow bypass device 500 in FIG. 5A. The flow bypass device 500 has a pipe portion 510, distributor portion 520, and a top assembly 540 containing a rupture disk. The pipe portion 510 is embodied as a pipe having the first end 512 connected to the top assembly 540 and the second end 513 connected to the distributor portion 520. The distributor portion 520 is embodied as a disc having disc-shaped center in the center section 526 and ring-shaped periphery section 527 that extends around the circumference of the center section 526. The end 531 of the ring-shaped periphery section 527 is sealed so that gas flows out of the flow bypass device 500 only through the openings 523 formed in the bottom 524 of the distributor portion 520. It is contemplated the openings 523 in FIG. 5B can have any shape or combination of shapes including circular shape, oval shape, triangular shape, quadrilateral shape (e.g., square, rectangle, diamond).

FIGS. 6-8 illustrate systems 600, 700, and 800 that utilize one or more flow bypass devices inside a vessel 601 that contains a fixed bed 602 of solid particles 603.

The vessel 601 is configured as a down-flow oriented vessel having an inlet pipe 605 on the top of the vessel 601 and an outlet pipe 609 on the bottom of the vessel 601. The vessel is generally cylindrical in shape, having flat or rounded top and bottom. The material of construction of the vessel 601 can be any metal that is compatible with the chemicals and materials used therein. The vessel 601 can be embodied as a reactor vessel (e.g., a hydrotreater, hydrocracker, or contaminant guard bed) of a reactor system, and the solid particles 603 contained in the fixed bed 602 can be catalyst particles (the fixed bed 602 of solid particles 603 is a catalyst bed). Alternatively, the vessel 601 can be a treater and the solid particles 603 contained in the fixed bed 602 of solid particles 603 can be adsorbent or molecular sieve particles. In such embodiments, the reactor system can include the reactor vessel 601, a catalyst bed 602 contained within the vessel 601; and a flow bypass device (e.g., any flow bypass device described herein) having a lower portion contained within the catalyst bed 602, where the flow bypass device is configured to direct gas to an interior of the catalyst bed 602 only in a down-flow direction. The reactor system can also include a second flow bypass device (e.g., any flow bypass device described herein) contained within the catalyst bed 602, wherein a top of the second flow bypass device is fluidly connected to a bottom of the flow bypass device, wherein the second flow bypass device is configured to direct gas into the interior of the catalyst bed that is below the second flow bypass device and only in the down-flow direction.

The solid particles 603 in the systems 600, 700, and 800 in FIGS. 6-8 can be can be any type of solid particle for any type of application where gaseous materials are passed through a fixed bed of solid particles for reaction with or adsorption of one or more components of the gaseous material or for removal of a component in the gaseous material. Generally, the particle size of the solid particles 603 is in a range from about 0.05 in to about 0.75 in (1.3 mm to 19.1 mm); alternatively, from about 0.125 in to about 0.5 in (3.18 mm to 12.7 mm). In aspects, the solid particles 603 can be embodied as catalyst particles, particles that are catalyst compounds on an inert ceramic support (e.g., alumina, silica, titania, or a combination thereof), catalyst grading media, inert ceramic particles (e.g., alumina, silica, titania, or a combination thereof), or a combination thereof. The shape of each solid particle 603 can be any shape, such as spherical, trilobe, quadlobe, or extrudate.

In aspects, the gas that flow into the vessel 601 of this disclosure can be found in various types of gas phase or multi-phase (e.g., gas and liquid phases) hydrocarbon streams found in downstream hydrocarbon processing and petrochemical manufacturing. Examples of such streams include, but are not limited to a naphtha stream, a gas oil stream, a vacuum gas oil stream, a kerosene stream, a diesel stream, a resid stream, a pyrolysis gas stream, an olefin feed or recycle stream, and a diluent feed or recycle stream. The vessel 601 can be configured to react components of the gas with the solid particles 603 contained within the vessel 601 by hydrodesulfurization reactions (e.g., conversion of sulfur-containing compounds to hydrogen sulfide), hydrocracking reactions (e.g., conversion of larger hydrocarbons to smaller hydrocarbons), hydrogenation reactions (e.g., conversion of olefins or aromatic compounds to paraffins or non-aromatic compounds), or dehydrogenation reactions (e.g., aromatization). Alternatively, the vessel 601 can be configured to remove one or more components from the gas by contact with solid particles 603 contained within the vessel 601, for example, by absorption (e.g., water removal with molecular sieves, acid gas removal with absorbent). In aspects, the gas can contain liquid or vapor phase components that are considered to be contaminants in the gas such that removal is needed in the vessel 601 or downstream of the vessel 601. In aspects, the contaminants can include sulfur-containing compounds (other than hydrogen sulfide), nitrogen containing compounds, chlorine containing compounds, acid gases (e.g., hydrogen sulfide and/or carbon dioxide), and water (e.g., liquid or vapor phase).

FIG. 6 illustrates a side view of a system 600 that includes a vessel 601, where the vessel 601 contains a fixed bed 602 of solid particles 603 and a flow bypass device 100A (embodied as the flow bypass device 100 in FIG. 1). In practice, the fixed bed 602 and flow bypass device 100A are completely enclosed by the wall 604 of the vessel 601; thus, in FIG. 6, part of the wall 604 of the vessel 601 has been removed in order to view the fixed bed 602 and flow bypass device 100A contained within the vessel 601. The rupture disk 150A is contained within the top assembly 140A of the flow bypass device 100A. The flow bypass device 100A is placed in the vessel 601 such that an upper portion 620 of the flow bypass device 100A is above the top 607 of the fixed bed 602 and a lower portion 621 is below the top 607 of the fixed bed 602 and surrounded by solid particles 603. In FIG. 6, the top assembly 140A of the flow bypass device 100A is in the headspace 606 above the top 607 of the fixed bed 602, a top part of the pipe portion 110A is above the top 607 of the fixed bed 602 and extends into the headspace 606 above the top 607 of the fixed bed 602, a bottom part of the pipe portion 110A is below the top 607 of the fixed bed 602 and surrounded by the solid particles 603, and the distributor portion 120A is in the interior 611 of the fixed bed 602 and entirely surrounded by the solid particles 603.

In aspects, the length of the pipe portion 110A of the flow bypass device 100A can be in a range of from about 1% to 50% of the height of the vessel 601, and the distributor portion 120A of the flow bypass device 100A can be located 1, 2, 3, 4, 5, or more feet (0.3048, 0.6096, 0.9144, 1.219, 1.524 m) below the top 607 of the fixed bed 602 of solid particles 603.

In operation, gas flows into the vessel 601 via an inlet pipe 605 in the direction of arrow C, i.e., a down-flow direction. The gas may experience flows in many directions within the headspace 606 between the top 607 of the fixed bed 602 and the inlet pipe 605 of the vessel 601. The gas flows in the down-flow direction into the top 607 of the fixed bed 602 of solid particles 603, as indicated by arrows B. The gas continues in a downward direction through the fixed bed 602, flowing around and through the solid particles 603 of the fixed bed 602 from top 607 to bottom 608 of the fixed bed 602. The reacted or treated gas then flows out of the vessel 601 via outlet pipe 609 in the direction of arrow D.

In various applications, such as for catalytic reactions or contaminant removal in the system 600, the solid particles 603 at the top 607 or within a top layer 610 of the solid particles 603 of the fixed bed 602 can also become fouled with contaminants such as coke, undesired polymer, scale, debris from upstream equipment, or a combination thereof. Over time, the differential pressure in the headspace 606 increases in order to flow the gas into the top 607 of the fixed bed 602 of solid particles 603. In the system 600, the flow bypass device 100A is configured such that the rupture disk 150A bursts at a threshold pressure, or burst pressure. Upon bursting, the differential pressure required to flow the gas through the flow bypass device 100A is less than the differential pressure required to flow the gas through the top 607 or top layer 610 of the fixed bed 602. Without changing or restricting a flow of the gas to the vessel 601, the gas is re-routed to flow into the pipe portion 110A of the flow bypass device 100A and then into the distributor portion 120A in the direction of arrows I1. The gas then flows out of the distributor portion 120A through one or more openings 123A in the direction of arrows A1, in a down-flow direction into the interior 611 of the fixed bed 602 that is below the bottom 124A of the flow bypass device 100A. The gas continues in a downward direction through the remainder of the fixed bed 602, flowing around and through the solid particles 603 of the fixed bed 602 to the bottom 608 of the fixed bed 602. The reacted or treated gas then flows out of the vessel 601 via outlet pipe 609 in the direction of arrow D.

As can be seen in FIG. 6, the one or more openings 123A formed in the bottom 124A of the distributor portion 120A of the flow bypass device 100A face a bottom 612 of the vessel 601.

The burst pressure, or threshold pressure, of the rupture disk 150A can be in a range of from about 5 psi to about 75 psi (34.5 kPa to 517.1 kPa) differential pressure.

In aspects, a ratio of the inner diameter of the pipe portion 110A of the first flow bypass device 100A to the inner diameter of the inlet pipe 605 can be in a range of from about 0.5 to about 5, for example, about 0.5, 0.6, 0.7, 0.8, 0.9, 1, 2, 3, 4, or 5. The ratio of the inner diameter of the pipe portion 110A of the flow bypass device 100A to the inner diameter of the inlet pipe 605 can be less than 1 so as to facilitate placement of pieces of the flow bypass devices 100A into the inlet 605 of the vessel 601 for assembly of the devices 100A inside the vessel 601. The ratio of the inner diameter of the pipe portion 110A of the flow bypass device 100A to the inner diameter of the inlet pipe 605 can be greater than 1 when other openings (e.g., a manway or large flange) are available on a vessel 601 for placing the pre-assembled flow bypass device 100A in the vessel 601, or for placing unassembled components that would not fit through inlet 605 into the vessel 601 for assembly inside the vessel 601.

In aspects, the flow bypass device 100A can be embodied as two to five (two, three, four, or five) flow bypass devices that are arranged such that a flow of gas through each of the two to five flow bypass devices is in parallel (as opposed to a stacked arrangement illustrated in FIGS. 7-8). In this arrangement, each flow bypass device is positioned in the fixed bed 602 in the manner shown for flow bypass device 100A in FIG. 6. That is, each flow bypass device can be placed in the vessel 601 such that an upper portion of each flow bypass device is above the top 607 of the fixed bed 602 and a lower portion is below the top 607 of the fixed bed 602 and surrounded by solid particles 603. The top assembly of each flow bypass device can be in the headspace 606 above the top 607 of the fixed bed 602, a top part of the pipe portion of each flow bypass device can be above the top 607 of the fixed bed 602 and extend into the headspace 606 above the top 607 of the fixed bed 602, a bottom part of the pipe portion of each flow bypass device can be below the top 607 of the fixed bed 602 and surrounded by the solid particles 603, and the distributor portion of each flow bypass device can be in the interior 611 of the fixed bed 602 and entirely surrounded by the solid particles 603.

FIG. 7 illustrates a side view of a system 700 that includes the vessel 601, where the vessel 601 contains a fixed bed 602 of solid particles 603, a first flow bypass device 100A (embodied as the flow bypass device 200 in FIG. 2, and a second flow bypass device 100B (embodied as the flow bypass device 100 in FIG. 1). The flow bypass device 100A has a spacer 202A that can be fluidly connected, coupled, or otherwise connected to the top assembly 140B of the second flow bypass device 100B. Similar to the illustration in FIG. 6, in FIG. 7 the wall 604 of the vessel 601 has been removed in order to view the fixed bed 602 and flow bypass devices 100A and 100B contained within the vessel 601. The rupture disk 150B is contained within the top assembly 140B of the second flow bypass device 100B. The flow bypass device 100B is placed in the vessel 601 such that solid particles 603 in the interior 611 of the fixed bed 602 below the bottom 124A of the first flow bypass device 100A entirely surround the second flow bypass device 100B in the solid particles 603.

The configuration and operation of the vessel 601, fixed bed 602, and first flow bypass device 100A is the same as that described in FIG. 6, and is not here reproduced. The system 700 of FIG. 7 additionally includes the second flow bypass device 100B having a top assembly 140B fluidly connected to the bottom 124A of the first flow bypass device 100A (e.g., via the spacer 202A) by any technique known in the art with the aid of this disclosure, such as welds, bolts, or a combination thereof.

After bursting of the first rupture disk 150A at the burst pressure, the gas flows through the first flow bypass device 100A and out the one or more openings 123A, into the interior 611 of the fixed bed 602 that is below the bottom 124A of the first flow bypass device 100A. A layer 701 of solid particles 603 of the fixed bed 602 that is below the openings 123A of the first flow bypass device 100A can also become fouled with contaminants such as coke, undesired polymer, scale, debris from upstream equipment, or a combination thereof. Over time, the differential pressure across the layer 701 of the fixed bed 602 that is below the one or more openings 123A of the first flow bypass device 100A increases in order to flow the gas through the first flow bypass device 100A and into the fixed bed 602. In the system 700, the flow bypass device 100B is configured such that the rupture disk 150B bursts at a second threshold pressure, or second burst pressure. Upon bursting, the pressure required to flow the gas through the flow bypass device 100B is less than the pressure required to flow the gas through the solid particles 603 in the layer 701 of the fixed bed 602 that is below the one or more openings 123A of the first flow bypass device 100A. Without changing or restricting a flow of the gas to the vessel 601, the gas is re-routed to flow into the pipe portion 110B of the second flow bypass device 100B and then into the distributor portion 120B in the direction of arrows I2. The gas then flows out of the distributor portion 120B through the one or more openings 123B in the direction of arrows A2, in a down-flow direction into the interior 611 of the fixed bed 602 that is below the bottom 124B of the flow bypass device 100B. The gas continues in a downward direction through the remainder of the fixed bed 602, flowing around and through the solid particles 603 of the fixed bed 602 to the bottom 608 of the fixed bed 602. The reacted or treated gas then flows out of the vessel 601 via outlet pipe 609 in the direction of arrow D.

As can be seen in FIG. 7, the one or more openings 123B formed in the bottom 124B of the distributor portion 120B of the second flow bypass device 100B face a bottom 612 of the vessel 601.

In aspects, the burst pressure, or threshold pressure, of the first rupture disk 150A and the second rupture disk 150B can each be in a range of from about 5 psi to about 75 psi (34.4 to 517.1 kPa) differential pressure; alternatively, from about 5 to about 50 psi (34.4 to 344.7 kPa) differential pressure; alternatively, from about 15 to about 25 psi (103.4 to 172.4 kPa) differential pressure. In additional aspects, the burst pressure of the first rupture disk 150A is less than the burst pressure of the second rupture disk 150B. In additional aspects, the burst pressure of the first rupture disk 150A can be in a range of from about 1 to about 20 psi (6.89 to 137.9 kPa); alternatively, from about 5 to about 15 psi (34.4 to 103.4 kPa); alternatively, from about 7 to about 14 psi (48.2 to 95.5 kPa) less than the burst pressure of the second rupture disk 150B.

In aspects, a ratio of the inner diameter of the pipe portion 110A of the first flow bypass device 100A to the inner diameter of the inlet pipe 605 can be in a range of from about 0.5 to about 5, for example, about 0.5, 0.6, 0.7, 0.8, 0.9, 1, 2, 3, 4, or 5; and a ratio of the inner diameter of the pipe portion 110B of the second flow bypass device 100B to the inner diameter of the inlet pipe 605 can be in a range of from about 0.5 to about 5, for example, about 0.5, 0.6, 0.7, 0.8, 0.9, 1, 2, 3, 4, or 5. In additional aspects, the inner diameter of the pipe portion 110A is the same as the inner diameter of the pipe portion 110B. The ratio of the inner diameter of the pipe portion 110A/110B of the flow bypass device 100A/100B to the inner diameter of the inlet pipe 605 can be less than 1 so as to facilitate placement of pieces of the flow bypass device 100A/100B into the inlet 605 of the vessel 601 for assembly of the device 100A/100B inside the vessel 601. The ratio of the inner diameter of the pipe portion 110A/110B of the flow bypass device 100A/100B to the inner diameter of the inlet pipe 605 can be greater than 1 when other openings (e.g., a manway or large flange) are available on a vessel 601 for placing the pre-assembled flow bypass device 100A/100B in the vessel 601, or placing unassembled components that would not fit through inlet 605 into the vessel 601 for assembly inside the vessel 601.

In aspects, the length of the pipe portion 110A of the flow bypass device 100A can be in a range of from about 1% to 50% of the height of the vessel 601, and the distributor portion 120A of the flow bypass device 100A can be located 1, 2, 3, 4, 5, or more feet (0.3048, 0.6096, 0.9144, 1.219, 1.524 m) below the top 607 of the fixed bed 602; while the length of the pipe portion 110B of the flow bypass device 100B can be in a range of about 1 ft to about 10 ft (0.3048 m to 3.048 m); alternatively, about 1 ft to about 5 ft (0.3048 m to 1.524 m).

FIG. 8 illustrates a side view of a system 800 that includes the vessel 601, where the vessel 601 contains a fixed bed 602 of solid particles 603, a first flow bypass device 100A (embodied as the flow bypass device 200 in FIG. 2), a second flow bypass device 100B (also embodied as the flow bypass device 200 in FIG. 2), and a third flow bypass device 100C (also embodied as the flow bypass device 100 in FIG. 1). Similar to the illustration in FIGS. 6 and 7, in FIG. 8 the wall 604 of the vessel 601 has been removed in order to view the fixed bed 602 and flow bypass devices 100A, 100B, and 100C contained within the vessel 601. The rupture disk 150C is contained within the top assembly 140C of the third flow bypass device 100C. The third flow bypass device 100C is placed in the vessel 601 such that solid particles 603 in the interior 611 of the fixed bed 602 below the bottom 124B of the second flow bypass device 100B entirely surround the third flow bypass device 100C in the solid particles 603.

The configuration and operation of the vessel 601, fixed bed 602, the first flow bypass device 100A, and the second flow bypass device 100B is the same as that described in FIGS. 6 and 7, and is not here reproduced. The system 800 of FIG. 8 additionally includes the third flow bypass device 100C having a top assembly 140C fluidly connected to the bottom 124B of the second flow bypass device 100B by any technique known in the art with the aid of this disclosure, such as welds, bolts, or a combination thereof. In aspects, the flow bypass device 100B can be embodied as the flow bypass device 200 of FIG. 2, having a spacer 202B that can be fluidly connected, coupled, or otherwise connected to the top assembly 140C of the third flow bypass device 100C.

After bursting of the second rupture disk 150B of the second flow bypass device 100B at the burst pressure, the gas flows through the second flow bypass device 100B and out the one or more openings 123B, into the interior 611 of the fixed bed 602 that is below the bottom 124B of the second flow bypass device 100B. A layer 801 of solid particles 603 of the fixed bed 602 that is below the one or more openings 123B of the second flow bypass device 100B can also become fouled with contaminants such as coke, undesired polymer, scale, debris from upstream equipment, or a combination thereof. Over time, the differential pressure for gas flow across the layer 801 of the fixed bed 602 that is below the one or more openings 123B of the second flow bypass device 100B increases. In the system 800, the flow bypass device 100C is configured such that the rupture disk 150C bursts at a third threshold pressure, or third burst pressure. Upon bursting, the pressure required to flow the gas through the flow bypass device 100C is less than the pressure required to flow the gas through the solid particles 603 in the layer 801 of the fixed bed 602. Without changing or restricting a flow of the gas to the vessel 601, the gas is re-routed to flow into the pipe portion 110C of the third flow bypass device 100C and then into the distributor portion 120C in the direction of arrows I3. The gas then flows out of the distributor portion 120C through one or more openings 123C in the direction of arrows A3, in a down-flow direction into the interior 611 of the fixed bed 602 that is below the bottom 124C of the flow bypass device 100C. The gas continues in a downward direction through the remainder of the fixed bed 602, flowing around and through the solid particles 603 of the fixed bed 602 to the bottom 608 of the fixed bed 602. The reacted or treated gas then flows out of the vessel 601 via outlet pipe 609 in the direction of arrow D.

As can be seen in FIG. 8, the one or more openings 123C formed in the bottom 124C of the distributor portion 120C of the third flow bypass device 100C face a bottom 612 of the vessel 601.

In aspects, the burst pressure, or threshold pressure, of the first rupture disk 150A, the second rupture disk 150B, and the third rupture disk 150C can each be in a range of from about 5 to about 75 psi (34.4 to 517.1 kPa) differential pressure; alternatively, from about 5 to about 50 psi (34.4 to 344.7 kPa) differential pressure; alternatively, from about 15 to about 25 psi (103.4 to 172.4 kPa) differential pressure. In additional aspects, the burst pressure of the first rupture disk 150A is less than the burst pressure of the second rupture disk 150B, and the burst pressure of the second rupture disk 150B is equal to or less than the burst pressure of the third rupture disk 150C. In additional aspects, the burst pressure of the first rupture disk 150A can be in a range of from about 1 to about 20 psi (6.89 to 137.9 kPa); alternatively, from about 5 to about 15 psi (34.4 to 103.4 kPa); alternatively, from about 7 to about 14 psi (48.2 to 95.5 kPa) less than the burst pressure of the second rupture disk 150B. In some aspects, the burst pressure of the second rupture disk 150B can be in the range of from about 1 to about 20 psi (6.89 to 137.9 kPa); alternatively, from about 5 to about 15 psi (34.4 to 103.4 kPa); alternatively, from about 7 to about 14 psi (48.2 to 95.5 kPa) less than the burst pressure of the third rupture disk 150C; while in other aspects, the burst pressure of the second rupture disk 150B can be about equal to the burst pressure of the third rupture disk 150C.

In aspects, a ratio of the inner diameter of the pipe portion 110A of the first flow bypass device 100A to the inner diameter of the inlet pipe 605 can be in a range of from about 0.5 to about 5, for example, about 0.5, 0.6, 0.7, 0.8, 0.9, 1, 2, 3, 4, or 5; a ratio of the inner diameter of the pipe portion 110B of the second flow bypass device 100B to the inner diameter of the inlet pipe 605 can be in a range of from about 0.5 to about 5, for example, about 0.5, 0.6, 0.7, 0.8, 0.9, 1, 2, 3, 4, or 5; and a ratio of the inner diameter of the pipe portion 110C of the second flow bypass device 100C to the inner diameter of the inlet pipe 605 can be in a range of from about 0.5 to about 5, for example, about 0.5, 0.6, 0.7, 0.8, 0.9, 1, 2, 3, 4, or 5. In additional aspects, the inner diameter of the pipe portion 110A is the same as the inner diameter of the pipe portion 110B and the inner diameter of the pipe portion 110C. The ratio of the inner diameter of the pipe portion 110A/110B/110C of the flow bypass device 100A/100B/100C to the inner diameter of the inlet pipe 605 can be less than 1 so as to facilitate placement of pieces of the flow bypass device 100A/100B/100C into the inlet 605 of the vessel 601 for assembly of the device 100A/100B/100C inside the vessel 601. The ratio of the inner diameter of the pipe portion 110A/110B/110C of the flow bypass device 100A/100B/100C to the inner diameter of the inlet pipe 605 can be greater than 1 when other openings (e.g., a manway or large flange) are available on a vessel 601 for placing the pre-assembled flow bypass device 100A/100B/100C in the vessel 601, or placing unassembled components that would not fit through inlet 605 into the vessel 601 for assembly inside the vessel 601.

In aspects, the length of the pipe portion 110A of the flow bypass device 100A can be in a range of from about 1% to 50% of the height of the vessel 601, and the distributor portion 120A of the flow bypass device 100A can be located 1, 2, 3, 4, 5, or more feet (0.3048, 0.6096, 0.9144, 1.219, 1.524 m) below the top 607 of the fixed bed 602; while the length of the pipe portion 110B of the flow bypass device 100B can be in a range of about 1 ft to about 10 ft (0.3048 m to 3.048 m); alternatively, about 1 ft to about 5 ft (0.3048 m to 1.524 m); and while the length of the pipe portion 110C of the flow bypass device 100C can be in a range of about 1 ft to about 10 ft (0.3048 m to 3.048 m); alternatively, about 1 ft to about 5 ft (0.3048 m to 1.524 m).

Aspects of the disclosure also include various methods which are described with reference numerals depicted in the figures.

A first method is for operating the vessel 601 containing the fixed bed 602 of solid particles 603. The first method can include flowing a gas in the down-flow direction into a top 607 of the fixed bed 602 of the solid particles 603. Over a first period of time, the solid particles 603 on the top 607 of the fixed bed 602 foul, causing the pressure in the headspace 606 of the vessel 601 to increase such that the differential pressure across the rupture disk 150A in the flow bypass device 100A also increases.

Upon reaching a burst pressure of the rupture disk 150A, the first method can additionally include flowing a gas through a first flow bypass device 100A and into an interior 611 of the fixed bed 602 of the solid particles 603 that is below a top 607 of the fixed bed 602, wherein the gas exits a distributor portion 120A of the first flow bypass device 100A in a down-flow direction. The flow of the gas through the first flow bypass device 100A is performed without changing or restricting a flow of the gas in the vessel 601, and the gas can enter the interior 611 of the fixed bed 602 from the first flow bypass device 100A only in the down-flow direction. The flow bypass device 100A in the method can have any configured discussed herein, e.g., any embodiment of flow bypass device 100 or 200.

The first method can also include, before flowing the gas through the first flow bypass device 100A, bursting a first rupture disk 150A of the first flow bypass device 100A (e.g., at a burst pressure in a range of from about 5 to about 75 psi (34.4 to 517.1 kPa) differential pressure; alternatively, from about 5 to about 50 psi (34.4 to 344.7 kPa) differential pressure; alternatively, from about 15 to about 25 psi (103.4 to 172.4 kPa) differential pressure), wherein the first rupture disk 150A is located proximate a top of the first flow bypass device 100A, an upper portion 620 of the first flow bypass device 100A is above the top 607 of the fixed bed 602, and a lower portion 621 of the first flow bypass device 100A is surrounded by the solid particles 603 in the interior 611 of the fixed bed 602.

Over a second period of time that is after the first period of time, the solid particles 603 in the interior 611 of the fixed bed 602 that are below the first flow bypass device 100A can foul, causing the pressure in the interior 611 of the vessel 601 that is below the first flow bypass device 100A to increase such that the differential pressure across the rupture disk 150B in the flow bypass device 100B also increases. In aspects, the first method can also include bursting the second rupture disk 150B of the second flow bypass device 100B (e.g., at a burst pressure in a range of from about 5 to about 75 psi (34.4 to 517.1 kPa) differential pressure; alternatively, from about 5 to about 50 psi (34.4 to 344.7 kPa) differential pressure; alternatively, from about 15 to about 25 psi (103.4 to 172.4 kPa) differential pressure), and without changing or restricting the flow of gas in the vessel 601, flowing the gas through the second flow bypass device 100B and into the interior 611 of the fixed bed 602 that is below the second flow bypass device 100B, such that the gas exits the second flow bypass device 100B in the down-flow direction. In these aspects of the first method, a first burst pressure of the first rupture disk 150A is less than a second burst pressure of the second rupture disk 150B.

Over a third period of time that is after the second period of time, the solid particles 603 in the interior 611 of the fixed bed 602 that are below the second flow bypass device 100B can foul, causing the pressure in the interior 611 of the vessel 601 that is below the first second bypass device 100B to increase such that the differential pressure across the rupture disk 150C in the flow bypass device 100C also increases. In aspects, the first method can also include bursting the third rupture disk 150C of the third flow bypass device 100C, and without changing or restricting the flow of gas in the vessel 601, flowing the gas through the third flow bypass device 100C and into the interior 611 of the fixed bed 602 that is below the third flow bypass device 100C, such that the gas exits the third flow bypass device 100C in the down-flow direction. In these aspects of the first method a first burst pressure of the first rupture disk 150A is less than a second burst pressure of the second rupture disk 150B, and the second burst pressure of the second rupture disk 150B is less than a third burst pressure of the third rupture disk 150C.

A second method is for operating a vessel 601 containing a fixed bed 602 of solid particles 603. The second method can include flowing a gas in a down-flow direction in the vessel 601, and upon experiencing a fouling of a top 607 of the fixed bed 602 of solid particles 603, re-routing the gas to an interior 611 (e.g., below the top 607, below a top layer 610, below another layer 701, or a combination thereof) of the fixed bed 602 only in the down-flow direction. In aspects, the step of re-routing comprises bursting a rupture disk (e.g., rupture disk 150A, 150B, 150C, or a combination thereof) of a flow bypass device (e.g., device 100A, 100B, 100C, or a combination thereof). In the second method, experiencing the fouling can be indicated by an increase in pressure across a portion (e.g., headspace 606) of the vessel 601 that is above the fixed bed 602 by greater than about 5 psi (0.0345 MPa).

A third method is for loading solid particles 603 and a flow bypass device 100A in a vessel 601, and will be described with reference to FIGS. 9A-9C. The third method can include placing a first portion 901 of the solid particles 603 into the vessel 601, assembling a flow bypass device 100A on a top 903 of the first portion 901 of the solid particles 603, and filling the vessel 601 with a second portion 902 of the solid particles 603 such that a bottom 124A or lower portion 621 of the flow bypass device 100A is surrounded by the solid particles 603. The third method can also include bracing the first flow bypass device 100A to the vessel 601 (e.g., against the wall 614 of the vessel 601) before filling the vessel 601 with the second portion 902 of the solid particles 603. In aspects, the bracing of the flow bypass device 100A can include i) contacting the wall 614 with a centering device (e.g., centering rods 904A) of the flow bypass device 100A, ii) securing the centering device to the wall 614, iii) connecting the centering device to the wall 614, iv) coupling the centering device to the wall 614, or the like.

A fourth method is for loading solid particles 603 and two flow bypass devices 100A and 100B in a vessel 601, and will be described with reference to FIGS. 10A-10C.

As shown in FIG. 10A, the fourth method can include placing a first portion 1001 of the solid particles 603 into the vessel 601. This is performed before any flow device is placed in the vessel 601.

In aspects, and with reference to FIG. 10B, the fourth method can include assembling a stack of the flow bypass devices 100B and 100A on a top 1003 of the first portion 1001 of the solid particles 603. The bottom 124A of the second flow bypass device 100A can be coupled to the rupture disk 150B of the first flow bypass device 100B prior to assembling the first flow bypass device 100B on the top 1003 of the first portion 1001 of the solid particles 603 (i.e., assembly of the first flow bypass device 100B and the second flow bypass device 100A occurs outside of the vessel 601). Alternatively, the second flow bypass device 100A can be coupled to the first flow bypass device 100B after the first flow bypass device 100B is placed on top 1003 of the first portion 1001 of the solid particles 603 (i.e., assembly of the first flow bypass device 100B and the second flow bypass device 100A occurs in the vessel 601).

The solid particles can be filled in the vessel 601 in alternative ways.

In a first alternative, and with reference to FIG. 10C, the fourth method include filling the vessel 601 with a second portion 1002C of the solid particles 603 such that i) the first flow bypass device 100B and the bottom 124A of the second flow bypass device 100A are surrounded by the solid particles 603, and ii) a top 1030 of the second flow bypass device 100A is above a top 607 of the fixed bed 602 of the solid particles 603.

In a second alternative, and with reference to both FIGS. 10B and 10C, the fourth method can include filling the vessel 601 with a second portion 1002A of the solid particles 603 such that a bottom 124B and lower portion 1021 of the first flow bypass device 100B is surrounded by the solid particles 603. This second technique allows for the first flow bypass device 100B to be coupled with the second flow bypass device 100A after the second portion 1002A of solid particles 603 are loaded in the vessel 601 before the final portion 1002B of solid particles is loaded into the vessel 601. With reference to FIG. 10C, after coupling the second flow bypass device 100A to the first flow bypass device 100B, the final portion 1002B of solid particles 603 can be loaded into the vessel 601 such that i) the first flow bypass device 100B and the bottom 124A and lower portion 621 of the second flow bypass device 100A are surrounded by the solid particles 603, and ii) a top 1030 of the second flow bypass device 100A is above a top 607 of the fixed bed 602 of the solid particles 603.

The fourth method can also include, before loading the solid particles 603 such that a flow bypass device is surrounded by solid particles 603, and with reference to FIG. 10B, bracing each of the first flow bypass device 100B and the second flow bypass device 100A to the vessel 601 (e.g., against the wall 614 of the vessel 601). The first flow bypass device 100B and the second flow bypass device 100A can each be braced before filling the vessel 601 with the second portion 1002C of the solid particles 603. In aspects, the bracing the first flow bypass device 100B can include contacting the wall 614 with a centering device (e.g., centering rods 904B) of the flow bypass device 100B, securing the centering device to the wall 614, connecting the centering device to the wall 614, coupling the centering device to the wall 614, or the like; and bracing the second flow bypass device 100A can include contacting the wall 614 with a centering device (e.g., centering rods 904A) of the flow bypass device 100A, securing the centering device to the wall 614, connecting the centering device to the wall 614, coupling the centering device to the wall 614, or the like.

A fifth method is for loading solid particles 603 and three flow bypass devices 100A, 100B, and 100C in a vessel 601, and will be described with reference to FIGS. 11A-11C.

As shown in FIG. 11A, the fifth method can include placing a first portion 1101 of the solid particles 603 into the vessel 601.

In aspects, and with reference to FIG. 11B, the fifth method can include assembling the stack of preassembled flow bypass devices 100A, 100B, and 100C on a top 1103 of the first portion 1101 of the solid particles 603. The devices 100A, 100B, and 100C can be preassembled where i) the bottom 124A of the third flow bypass device 100A is coupled to the rupture disk 150B of the second flow bypass device 100B and ii) the bottom 124B of the second flow bypass device 100B is coupled to the rupture disk 150C of the first flow bypass device 100C, prior to assembling the first flow bypass device 100C on the top 1103 of the first portion 1101 of the solid particles 603 (i.e., assembly of the stack of flow bypass devices 100A, 100B, and 100C occurs outside the vessel 601). Alternatively, the second flow bypass device 100B can be coupled to the first flow bypass device 100C and the first flow bypass device 100A can be coupled to the second flow bypass device 100B, after the first flow bypass device 100C is placed on top 1003 of the first portion 1001 of the solid particles 603 (i.e., assembly of the stack of flow bypass devices 100A, 100B, and 100C occurs inside the vessel 601).

Additional amounts of the solid particles can be filled in the vessel 601 in alternative ways.

In a first alternative, where the flow bypass devices 100A, 100B, and 100C are stacked and coupled before filling additional amounts of solid particles as shown in FIG. 11B, the fifth method can include filling the vessel 601 with a second portion 1102D of the solid particles 603 such that i) the first flow bypass device 100C, the second flow bypass device 100B, and the bottom 124A of the third flow bypass device 100A are surrounded by the solid particles 603, and ii) a top 1030 of the third flow bypass device 100A is above a top 607 of the fixed bed 602 of the solid particles 603, as shown in FIG. 11C.

In a second alternative, and with reference to FIGS. 11B and 11C, the fifth method can include filling the vessel 601 with a second portion 1102A of the solid particles 603 such that a bottom 124C and lower portion 1121 of the first flow bypass device 100C is surrounded by the solid particles 603. This second alternative allows for the first flow bypass device 100C to be coupled with the second flow bypass device 100B after the second portion 1102A of solid particles 603 are loaded in the vessel 601 and before the other portions 1102B and 1102C of solid particles 603 are loaded into the vessel 601. With reference to FIG. 10C, after coupling the second flow bypass device 100B to the first flow bypass device 100C, another portion 1102B of solid particles 603 can be loaded into the vessel 601 such that the first flow bypass device 100C and the bottom 124B and lower portion 1021 of the second flow bypass device 100B are surrounded by the solid particles 603. This second alternative allows for the second flow bypass device 100B to be coupled with the third flow bypass device 100A after the portion 1102B of solid particles 603 are loaded in the vessel 601 and before the final portion 1102C of solid particles 603 is loaded into the vessel 601. With reference to FIG. 10C, after coupling the second flow bypass device 100B to the third flow bypass device 100A, the final portion 1102C of solid particles 603 can be loaded into the vessel 601 such that i) the first flow bypass device 100C, the second flow bypass device 100B, ii) the bottom 124A and lower portion 621 of the third flow bypass device 100C are surrounded by the solid particles 603, and iii) a top 1030 of the second flow bypass device 100B is above a top 607 of the final portion 1102C of the solid particles 603. 1130

The fifth method in this aspect can also include, before loading the solid particles 603 such that a flow bypass device is surrounded by solid particles 603, and with reference to FIG. 11B, bracing each of the first flow bypass device 100C, the second flow bypass device 100B, and the third flow bypass device 100A to the vessel 601 (e.g., against the wall 614 of the vessel 601). The first flow bypass device 100C can be braced before filling the vessel 601 with the portion 1102A or 1102D of the solid particles 603, in combination with the second flow bypass device 100B being braced before filling the vessel 601 with portion 1102A, portion 1102B, or portion 1102D of the solid particles 603, in combination with the third flow bypass device 100A being braced before filling the vessel 601 with portion 1102C or 1102D of the solid particles 603. In aspects, bracing the first flow bypass device 100C, second flow bypass device 100B, and third flow bypass device 100A can each include contacting the wall 614 with a centering device (e.g., centering rods 904A, 904B, 904C) of the flow bypass device 100A, 100B, 100C, securing the centering device to the wall 614, connecting the centering device to the wall 614, coupling the centering device to the wall 614, or the like.

ADDITIONAL DISCLOSURE

The following is provided as additional disclosure for combinations of features and aspects of the present invention.

A first aspect, which is a method for operating a vessel containing a fixed bed of solid particles, comprising flowing a gas through a first flow bypass device and into an interior of the fixed bed of the solid particles that is below a top of the fixed bed, wherein the gas exits a distributor portion of the first flow bypass device in a down-flow direction.

A second aspect, which is the method of the first aspect, further comprising before flowing the gas through the first flow bypass device, flowing the gas in the down-flow direction into a top of the fixed bed of the solid particles.

A third aspect, which is the method of the second aspect, wherein flowing the gas through the first flow bypass device is performed without changing or restricting a flow of the gas in the vessel, wherein the gas enters the interior of the fixed bed from the first flow bypass device only in the down-flow direction.

A fourth aspect, which is the method of any of the first through the third aspects, wherein the solid particles have a particle size in a range of about 0.05 in to about 0.75 in (1.3 mm to 19.1 mm).

A fifth aspect, which is the method of any of the first through the fourth aspects, wherein the vessel is a hydrotreater, hydrocracker, or contaminant guard bed and the solid particles are catalyst particles; or wherein the vessel is a treater and the solid particles are molecular sieve particles.

A sixth aspect, which is the method of any of the first through the fifth aspects, wherein the first flow bypass device additionally has a pipe portion, wherein the distributor portion is connected to a bottom of a pipe portion, and a flow channel is formed within the pipe portion and the distributor portion, wherein openings formed in a bottom of the distributor portion face a bottom of the vessel.

A seventh aspect, which is the method of the sixth aspect, wherein the distributor portion comprises a center section and a periphery section connected to the center section, wherein the center section is connected to the bottom of the pipe portion, and wherein the openings are formed in a bottom of the periphery section.

An eighth aspect, which is the method of any of the sixth and the seventh aspects, wherein the pipe portion has no perforations.

A ninth aspect, which is the method of any of the first through the eighth aspects, wherein the first flow bypass device comprises two to five flow bypass devices arranged such that a flow of gas through each of the two to five flow bypass devices is in parallel.

A tenth aspect, which is the method of any of the first through the ninth aspects, further comprising before flowing the gas through the first flow bypass device, bursting a first rupture disk of the first flow bypass device, wherein the first rupture disk is located proximate a top of the first flow bypass device, an upper portion of the first flow bypass device is above the top of the fixed bed, and a lower portion of the first flow bypass device is surrounded by the solid particles.

An eleventh aspect, which is the method of the tenth aspect, wherein a burst pressure of the first rupture disk is in a range of from about 5 psi to about 75 psi (34.5 kPa to 517.1 kPa) differential pressure.

A twelfth aspect, which is the method of the tenth aspect, wherein a second flow bypass device is surrounded by the solid particles in the interior of the fixed bed below the first flow bypass device, wherein a top assembly of the second flow bypass device is fluidly connected to a bottom of the first flow bypass device, the method further comprising bursting a second rupture disk of the second flow bypass device, and without changing or restricting a flow of gas in the vessel, flowing the gas through the second flow bypass device and into the interior of the fixed bed that is below the second flow bypass device, wherein the gas exits the second flow bypass device in the down-flow direction.

A thirteenth aspect, which is the method of the twelfth aspect, wherein a burst pressure of the second rupture disk is in a range of from about 5 psi to about 75 psi (34.5 kPa to 517.1 kPa) differential pressure.

A fourteenth aspect, which is the method of any of the twelfth and the thirteenth aspects, wherein a first burst pressure of the first rupture disk is less than a second burst pressure of the second rupture disk.

A fifteenth aspect, which is the method of any of the twelfth through the fourteenth aspects, wherein a third flow bypass device is surrounded by the solid particles in the interior of the fixed bed below the second flow bypass device, wherein a top assembly of the third flow bypass device is fluidly connected to a bottom of the second flow bypass device, the method further comprising bursting a third rupture disk of the third flow bypass device, and without changing or restricting a flow of gas in the vessel, flowing the gas through the third flow bypass device and into the interior of the fixed bed that is below the third flow bypass device, wherein the gas exits the third flow bypass device in the down-flow direction.

A sixteenth aspect, which is the method of the fifteenth aspect, wherein a burst pressure of the third rupture disk is in a range of from about 5 psi to about 75 psi (34.5 kPa to 517.1 kPa) differential pressure.

A seventeenth aspect, which is the method of any of the fifteenth and the sixteenth aspects, wherein a first burst pressure of the first rupture disk is less than a second burst pressure of the second rupture disk, and wherein the second burst pressure of the second rupture disk is less than a third burst pressure of the third rupture disk.

An eighteenth aspect, which is a method for loading solid particles and a flow bypass device in a vessel, comprising placing a first portion of the solid particles into the vessel, assembling a first flow bypass device on a top of the first portion of the solid particles, and filling the vessel with a second portion of the solid particles such that a bottom of the first flow bypass device is surrounded by the solid particles, wherein the first flow bypass device has a pipe portion and a distributor portion, wherein the distributor portion is connected to a bottom of the pipe portion, and a flow channel is formed within the pipe portion and the distributor portion, wherein openings formed in a bottom of the distributor portion face a bottom of the vessel, and wherein a first rupture disk is located proximate the top of the pipe portion.

A nineteenth aspect, which is the method of the eighteenth aspect, wherein the vessel has an inlet pipe configured to receive a gas, and wherein an inner diameter of the pipe portion of the first flow bypass device is from about 0.1 to about 5 times a cross-sectional area of the inlet pipe.

A twentieth aspect, which is the method of any of the eighteenth and the nineteenth aspects, further comprising bracing the first flow bypass device to the vessel before filling the vessel with the second portion of the solid particles.

A twenty-first aspect, which is the method of any of the eighteenth through the twentieth aspects, further comprising coupling a bottom of a second flow bypass device to the first rupture disk of the first flow bypass device, and filling the vessel with a third portion of the solid particles such that i) the first flow bypass device and the bottom of the second flow bypass device are surrounded by the solid particles, and ii) a top of the second flow bypass device is above a top of a fixed bed of the solid particles.

A twenty-second aspect, which is the method of the twenty-first aspect, further comprising bracing the first flow bypass device to the vessel before filling the vessel with the second portion of the solid particles, and bracing the second flow bypass device to the vessel before filling the vessel with the third portion of the solid particles.

A twenty-third aspect, which is a flow bypass device comprising a pipe portion having a first flow channel formed therein and extending from a first end of the pipe portion to a second end of the pipe portion, a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion, and a rupture disk coupled to the first end of the pipe portion.

A twenty-fourth aspect, which is the flow bypass device of the twenty-third aspect, further comprising a cap coupled to the rupture disk or to first end of the pipe portion, wherein the rupture disk is positioned between the cap and the first end of the pipe portion, wherein the cap has openings formed therein that are configured to allow gas to pass through the cap.

A twenty-fifth aspect, which is the flow bypass device of any of the twenty-third through the twenty-fourth aspects, wherein a length of the pipe portion is in a range of from about 1% to 50% of a height of a vessel in which the flow bypass device is placed.

A twenty-sixth aspect, which is the flow bypass device of any of the twenty-third through the twenty-fifth aspects, wherein a burst pressure of the rupture disk is in a range of from about 5 psi to about 75 psi (34.5 kPa to 517.1 kPa) differential pressure.

A twenty-seventh aspect, which is the flow bypass device of any of the twenty-third through the twenty-sixth aspects, wherein the pipe portion has no perforations.

A twenty-eighth aspect, which is the flow bypass device of the twenty-third through the twenty-seventh aspects, further comprising a centering device attached to the pipe portion, the distributor portion, or to both the pipe portion and the distributor portion, wherein the centering device is configured to rest against a wall of a vessel or to couple the centering device to the wall of the vessel.

A twenty-ninth aspect, which is a reactor system comprising a reactor vessel, a catalyst bed contained within the reactor vessel, and a flow bypass device having a lower portion contained within the catalyst bed, wherein the flow bypass device is configured to direct gas to an interior of the catalyst bed only in a down-flow direction.

A thirtieth aspect, which is the reactor system of the twenty-ninth aspect, further comprising a second flow bypass device contained within the catalyst bed, wherein a top of the second flow bypass device is fluidly connected to a bottom of the flow bypass device, wherein the second flow bypass device is configured to direct gas into the interior of the catalyst bed that is below the second flow bypass device and only in the down-flow direction.

A thirty-first aspect, which is a method for operating a vessel containing a fixed bed of solid particles, comprising flowing a gas in a down-flow direction in the vessel, and upon experiencing a fouling of a top of the fixed bed of solid particles, re-routing the gas to an interior of the fixed bed only in the down-flow direction.

A thirty-second aspect, which is the method of the thirty-first aspect, wherein the step of re-routing comprises bursting a rupture disk of a flow bypass device.

A thirty-third aspect, which is the method of the thirty-first aspect, wherein experiencing the fouling is indicated by an increase in differential pressure across a portion of the fixed bed by greater than about 5 psi (0.0345 MPa).

A thirty-fourth aspect, which is a flow bypass device comprising a pipe portion having a first flow channel formed therein and extending from a first end of the pipe portion to a second end of the pipe portion, a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion, and a rupture disk coupled to the first end of the pipe portion.

A thirty-fifth aspect, which is the flow bypass device of the thirty-fourth aspect, further comprising a top assembly containing the rupture disk and connected to the first end of the pipe portion, and a cap coupled to the top assembly, to the pipe portion, or to both the top assembly and the pipe portion, wherein the rupture disk is positioned between the cap and the first end of the pipe portion.

A thirty-sixth aspect, which is the flow bypass device of the thirty-fifth aspect, wherein the cap comprises a cover, and at least two arms, each of the at least two arms being configured to couple the cover to the top assembly, to the pipe portion, or to both the top assembly and the pipe portion.

A thirty-seventh aspect, which is the flow bypass device of the thirty-sixth aspect, wherein each of the at least two arms has an end connected to an underside of the cover and an opposite end connected to the top assembly, to the pipe portion, or to both the top assembly and the pipe portion.

A thirty-eighth aspect, which is the flow bypass device of the thirty-sixth aspect, further comprising a gap formed between the cover and the top assembly.

A thirty-ninth aspect, which is the flow bypass device of the thirty-eighth aspect, wherein the gap has an area greater than or equal to a cross-sectional area of the first flow channel.

A fortieth aspect, which is the flow bypass device of any of the thirty-fourth through the thirty-ninth aspects, wherein a length of the pipe portion is in a range of from about 1% to 50% of a height of a vessel in which the flow bypass device is placed.

A forty-first aspect, which is the flow bypass device of the thirty-fourth through the fortieth aspects, wherein a burst pressure of the rupture disk is in a range of from about 5 psi to about 75 psi (34.5 kPa to 517.1 kPa) differential pressure.

A forty-second aspect, which is the flow bypass device of any of the thirty-fourth through the forty-first aspects, wherein the pipe portion has no perforations.

A forty-third aspect, which is the flow bypass device of any of the thirty-fourth through the forty-second aspects, further comprising a centering device attached to the pipe portion, the distributor portion, or to both the pipe portion and the distributor portion, wherein the centering device is configured to rest against a wall of a vessel or to couple the centering device to the wall of the vessel.

A forty-fourth aspect, which is the flow bypass device of any of the thirty-fourth through the forty-third aspects, wherein the distributor portion has a center opening formed in a center section of the distributor portion on the bottom of the distributor portion.

A forty-fifth aspect, which is the flow bypass device of the forty-fourth aspect, further comprising a spacer having a hollow tubular shape and configured to fluidly couple to the center opening.

A forty-sixth aspect, which is a reactor system comprising a reactor vessel, a catalyst bed contained within the reactor vessel, and a first flow bypass device having a lower portion contained within the catalyst bed, wherein the first flow bypass device is configured to direct gas to an interior of the catalyst bed only in a down-flow direction.

A forty-seventh aspect, which is the reactor system of the forty-sixth aspect, further comprising a second flow bypass device contained within the catalyst bed, wherein a top of the second flow bypass device is fluidly connected to a bottom of the first flow bypass device, wherein the second flow bypass device is configured to direct gas into the interior of the catalyst bed that is below the second flow bypass device and only in the down-flow direction.

A forty-eighth aspect, which is the reactor system of the forty-seventh aspect, wherein the first flow bypass device comprises a pipe portion having a first flow channel formed therein and extending from a first end of the pipe portion to a second end of the pipe portion, a distributor portion connected to the second end of the pipe portion, wherein the distributor portion has a second flow channel formed therein that is fluidly connected to the first flow channel of the pipe portion and to an opening formed in a bottom of the distributor portion, and a rupture disk coupled to the first end of the pipe portion.

A forty-ninth aspect, which is the reactor system of the forty-eighth aspect, wherein the distributor portion of the first flow bypass device has a center opening formed in a center section of the distributor portion on the bottom of the distributor portion, wherein the center opening configured to couple with the top of the second flow bypass device.

A fiftieth aspect, which is the reactor system of the forty-ninth aspect, wherein the first flow bypass further comprises a spacer configured to provide spacing between the bottom of the first flow bypass device and the top of the second flow bypass device, wherein the spacer is configured to fluidly couple the center opening with a top assembly of the second flow bypass device.

A fifty-first aspect, which is the reactor system of the forty-eighth aspect, wherein a longitudinal axis of the opening is parallel to a longitudinal axis of the pipe portion.

A fifty-second aspect, which is the reactor system of any of the forty-eighth through the fifty-first aspects, wherein the first flow bypass device further comprises a top assembly containing the rupture disk and connected to the first end of the pipe portion, and a cap coupled to the top assembly, to the pipe portion, or to the top assembly and to the pipe portion, wherein the rupture disk is positioned between the cap and the first end of the pipe portion.

A fifty-third aspect, which is a method comprising loading a flow bypass device into an interior of a fixed bed of solid particles contained within a vessel, and/or flowing a gas through the flow bypass device and into the interior of the fixed bed of solid particles that is below a top of the fixed bed, wherein the gas exits a distributor portion of the flow bypass device in a down-flow direction.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, 5, 6, . . . ; greater than 0.10 includes 0.11, 0.12, 0.13, 0.14, 0.15, . . . ). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the detailed description of the present invention.

What is claimed is:

1. A flow bypass device comprising:
   a pipe portion having a first flow channel formed therein and extending from a first end of the pipe portion to a second end of the pipe portion;
   a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion; and
   a rupture disk coupled to the first end of the pipe portion, wherein the pipe portion has no perforations.

2. The flow bypass device of claim 1, further comprising:
   a top assembly containing the rupture disk and connected to the first end of the pipe portion; and
   a cap coupled to the top assembly, to the pipe portion, or to both the top assembly and the pipe portion,
   wherein the rupture disk is positioned between the cap and the first end of the pipe portion.

3. The flow bypass device of claim 2, wherein the cap comprises:
   a cover; and
   at least two arms, each of the at least two arms being configured to couple the cover to the top assembly, to the pipe portion, or to both the top assembly and the pipe portion.

4. The flow bypass device of claim 3, wherein each of the at least two arms has an end connected to an underside of the cover and an opposite end connected to the top assembly, to the pipe portion, or to both the top assembly and the pipe portion.

5. The flow bypass device of claim 3, further comprising:
   a gap formed between the cover and the top assembly.

6. The flow bypass device of claim 5, wherein the gap has an area greater than or equal to a cross-sectional area of the first flow channel.

7. The flow bypass device of claim 1, wherein a length of the pipe portion is in a range of from about 1% to 50% of a height of a vessel in which the flow bypass device is placed.

8. The flow bypass device of claim 1, wherein a burst pressure of the rupture disk is in a range of from about 5 psi to about 75 psi (34.5 kPa to 517.1 kPa) differential pressure.

9. The flow bypass device of claim 1, further comprising:
   a centering device attached to the pipe portion, the distributor portion, or to both the pipe portion and the distributor portion, wherein the centering device is configured to rest against a wall of a vessel or to couple the centering device to the wall of the vessel.

10. The flow bypass device of claim 1, wherein the distributor portion has a center opening formed in a center section of the distributor portion on the bottom of the distributor portion.

11. The flow bypass device of claim 10, further comprising:
   a spacer having a hollow tubular shape and configured to fluidly couple to the center opening.

12. A reactor system comprising:
a reactor vessel;
a catalyst bed contained within the reactor vessel;
a first flow bypass device having a lower portion contained within the catalyst bed, wherein the first flow bypass device is configured to direct gas to an interior of the catalyst bed only in a down-flow direction;
a second flow bypass device contained within the catalyst bed, wherein a top of the second flow bypass device is fluidly connected to a bottom of the first flow bypass device, wherein the second flow bypass device is configured to direct gas into the interior of the catalyst bed that is below the second flow bypass device and only in the down-flow direction,
wherein the first flow bypass device comprises:
a pipe portion having a first flow channel formed therein and extending from a first end of the pipe portion to a second end of the pipe portion;
a distributor portion connected to the second end of the pipe portion, wherein the distributor portion has a second flow channel formed therein that is fluidly connected to the first flow channel of the pipe portion and to an opening formed in a bottom of the distributor portion; and
a rupture disk coupled to the first end of the pipe portion.

13. The reactor system of claim 12, wherein the distributor portion of the first flow bypass device has a center opening formed in a center section of the distributor portion on the bottom of the distributor portion, wherein the center opening configured to couple with the top of the second flow bypass device.

14. The reactor system of claim 13, wherein the first flow bypass further comprises:
a spacer configured to provide spacing between the bottom of the first flow bypass device and the top of the second flow bypass device, wherein the spacer is configured to fluidly couple the center opening with a top assembly of the second flow bypass device.

15. The reactor system of claim 12, wherein a longitudinal axis of the opening is parallel to a longitudinal axis of the pipe portion.

16. The reactor system of claim 12, wherein the first flow bypass device further comprises:
a top assembly containing the rupture disk and connected to the first end of the pipe portion; and
a cap coupled to the top assembly, to the pipe portion, or to the top assembly and the pipe portion,
wherein the rupture disk is positioned between the cap and the first end of the pipe portion.

17. A flow bypass device comprising:
a pipe portion having a first flow channel formed therein and extending from a first end of the pipe portion to a second end of the pipe portion;
a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion;
a rupture disk coupled to the first end of the pipe portion;
a top assembly containing the rupture disk and connected to the first end of the pipe portion; and
a cap coupled to the top assembly, to the pipe portion, or to both the top assembly and the pipe portion,
wherein the rupture disk is positioned between the cap and the first end of the pipe portion, and
wherein the cap comprises:
a cover; and
at least two arms, each of the at least two arms being configured to couple the cover to the top assembly, to the pipe portion, or to both the top assembly and the pipe portion.

18. The flow bypass device of claim 17, wherein each of the at least two arms has an end connected to an underside of the cover and an opposite end connected to the top assembly, to the pipe portion, or to both the top assembly and the pipe portion.

19. The flow bypass device of claim 17, further comprising:
a gap formed between the cover and the top assembly.

20. The flow bypass device of claim 19, wherein the gap has an area greater than or equal to a cross-sectional area of the first flow channel.

21. A flow bypass device comprising:
a pipe portion having a first flow channel formed therein and extending from a first end of the pipe portion to a second end of the pipe portion;
a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion;
a rupture disk coupled to the first end of the pipe portion; and
a centering device attached to the pipe portion, the distributor portion, or to both the pipe portion and the distributor portion, wherein the centering device is configured to rest against a wall of a vessel or to couple the centering device to the wall of the vessel.

22. A flow bypass device comprising:
a pipe portion having a first flow channel formed therein and extending from a first end of the pipe portion to a second end of the pipe portion;
a distributor portion connected to the second end of the pipe portion, wherein the distributor portion has a second flow channel formed therein that is fluidly connected to the first flow channel of the pipe portion and to an opening formed in a bottom of the distributor portion, wherein a longitudinal axis of the opening is parallel to a longitudinal axis of the pipe portion; and
a rupture disk coupled to the first end of the pipe portion,
wherein the distributor portion has a center opening formed in a center section of the distributor portion on the bottom of the distributor portion.

23. The flow bypass device of claim 22, further comprising:
a spacer having a hollow tubular shape and configured to fluidly couple to the center opening.

* * * * *